(12) United States Patent
Feng et al.

(10) Patent No.: US 12,096,280 B2
(45) Date of Patent: Sep. 17, 2024

(54) SYSTEM AND A METHOD FOR INCREASING NETWORK EFFICIENCY IN A 5G-V2X NETWORK

(71) Applicant: Hong Kong Applied Science And Technology Research Institute Co., Ltd., Hong Kong (CN)

(72) Inventors: Jiashi Feng, Guangdong (CN); Jianjun Zhang, Guangdong (CN); Linhuan Chen, Guangdong (CN); Zigan Zhou, Tai Po (HK); Hang Chen, Kowloon Bay (HK); Dongzhe Su, Guangdong (CN); Shijun Fan, Fanling (HK)

(73) Assignee: Hong Kong Applied Science And Technology Research Institute Co., Ltd, Shatin (HK)

( * ) Notice: Subject to any disclaimer, the term of this patent is extended or adjusted under 35 U.S.C. 154(b) by 329 days.

(21) Appl. No.: 17/689,184

(22) Filed: Mar. 8, 2022

(65) Prior Publication Data
US 2023/0292181 A1    Sep. 14, 2023

(51) Int. Cl.
*H04W 28/22* (2009.01)
*G08G 1/01* (2006.01)
*H04W 4/40* (2018.01)

(52) U.S. Cl.
CPC .......... *H04W 28/22* (2013.01); *G08G 1/0112* (2013.01); *G08G 1/012* (2013.01); *H04W 4/40* (2018.02)

(58) Field of Classification Search
CPC ... H04W 28/22; H04W 4/40; H04W 28/0289; G08G 1/0112; G08G 1/012; H04L 41/0806; H04L 41/0894; H04L 47/22; H04L 47/2416; H04L 47/25; H04L 41/16
See application file for complete search history.

(56) References Cited

U.S. PATENT DOCUMENTS

| | | | |
|---|---|---|---|
| 10,212,102 B2 | 2/2019 | Lee et al. | |
| 10,403,135 B2 | 9/2019 | Rosales et al. | |
| 10,873,876 B2 | 12/2020 | Higuchi et al. | |
| 10,992,589 B2 | 4/2021 | Cheng et al. | |
| 10,992,752 B2 | 4/2021 | Graefe et al. | |
| 10,993,247 B2* | 4/2021 | Seo | H04W 8/04 |
| 2017/0201461 A1 | 7/2017 | Cheng et al. | |
| 2019/0159223 A1* | 5/2019 | Park | H04W 72/543 |

(Continued)

FOREIGN PATENT DOCUMENTS

| | | |
|---|---|---|
| CN | 108182817 A | 6/2018 |
| CN | 109314841 A | 2/2019 |

(Continued)

*Primary Examiner* — Mewale A Ambaye
(74) *Attorney, Agent, or Firm* — GableGotwals

(57) ABSTRACT

Provided is a method and system for controlling data transmission in a 5G-V2X network. The 5G-V2X network has at least one defined geographical area including a plurality of traffic sensing devices (TSDs). Each of the TSDs is configured to provide data over one or more 5G channels to a V2X processing system via an edge gateway module (EGW) of the defined geographical area. The EGW includes a transmission controller (TC). The method comprises the TC dynamically adjusting a data transmission frequency of at least one TSD of the plurality of TSDs in accordance with a transmission control policy.

20 Claims, 22 Drawing Sheets

(56) References Cited

U.S. PATENT DOCUMENTS

| | | |
|---|---|---|
| 2020/0100048 A1 | 3/2020 | Wu et al. |
| 2021/0099976 A1 | 4/2021 | Mueck et al. |
| 2021/0410156 A1 | 12/2021 | Deng |
| 2022/0408245 A1* | 12/2022 | Maass .................. H04L 9/06 |
| 2022/0408447 A1* | 12/2022 | Mueck ............... H04W 64/003 |
| 2023/0319527 A1* | 10/2023 | Shuman ................ H04W 8/22 |
| | | 370/252 |
| 2023/0362852 A1* | 11/2023 | He ......................... H04L 5/001 |

FOREIGN PATENT DOCUMENTS

| | | | |
|---|---|---|---|
| CN | 110475225 | * | 11/2019 |
| CN | 110475225 A | | 11/2019 |
| CN | 110621006 A | | 12/2019 |
| CN | 110933118 A | | 3/2020 |
| CN | 111294750 A | | 6/2020 |
| CN | 112055330 A | | 12/2020 |
| CN | 112289059 | * | 1/2021 |
| CN | 112289059 A | | 1/2021 |
| CN | 112822656 | * | 5/2021 |
| CN | 112822656 A | | 5/2021 |

\* cited by examiner

SYSTEM AND A METHOD FOR INCREASING NETWORK EFFICIENCY IN A 5G-V2X NETWORK

FIELD OF THE INVENTION

The invention relates to a system and a method for increasing network efficiency in a 5G-V2X network and, particularly, but not exclusively, to a system and method for improving road safety and/or management in a 5G-V2X network.

BACKGROUND OF THE INVENTION

Vehicle-to-Everything (V2X) is a vehicular communication system configured to deliver information from a vehicle to any entity that may affect the vehicle, and vice versa. The system incorporates other more specific types of communications including, but not limited to, Vehicle-to-Infrastructure (V2I), Vehicle-to-Vehicle (V2V), Vehicle-to-Pedestrian (V2P), Vehicle-to-Device (V2D), and Vehicle-to-Grid (V2G).

In a V2X system with smart mobility roadside infrastructure comprising roadside units (RSUs) including traffic sensing devices (TSDs) such as, for example, lidar, radar, camera, etc., the RSUs and TSDs send their collected data through one or more 5G channels to a 5G-V2X central data processing platform or an edge V2X processing platform such as an edge gateway module (EGW). The roadside infrastructure collects all sensor data, i.e., traffic data, for processing at the EGW to discover, determine and/or calculate useful information to send through the V2X network to the road users; more particularly, but not exclusively to vehicle users. Such useful information may include traffic alerts, possible dangerous traffic situation warnings, suggestions for road users to make better and/or safer decisions, etc. The deployed RSUs and TSDs will typically collect and/or generate large amounts of data which may consume a significant portion of the 5G-V2X communication channel resources potentially resulting in one or more of network congestion, data transmission delays, slow provision of services in the 5G-V2X network. In some cases, it is impossible, or at least impracticable, to transmit all RSU and/or TSD data through the one or more 5G channels of the 5G-V2X network.

US20210099976A1 discloses an edge network infrastructure (e.g., an RSU, a RAN node or a collocated MEC server/host) for determining a required amount of spectrum (such as Long-Term Evolution Cellular V2X (LTE-CV2X), Dedicated Short-Range Communications (DSRC)/Intelligent Transport Systems-G5 (ITS-G5)) for each vehicular communication system based on detecting the number of vehicle User Equipments (vUEs) using each type of vehicular communication technology during a service period. It discloses dynamically assigning a preferred channel allocation and forwarding the allocation to neighboring infrastructure (e.g., one or more RSUs) to reconfigure themselves to provide the related services for the vUEs.

CN112822656A discloses a vehicle-mounted V2X intelligent terminal supporting 5G communication which consists of a 5G/V2X on-board unit (OBU) and a vehicle-mounted sensing system. The vehicle-mounted terminal is designed to provide longer communication distance and higher reliability compared with the DSRC, and to have a lower time delay and larger data transmission capacity in the V2X cloud network compared with the LTE-V2X communication system.

CN112055330A discloses a 5G-based V2X vehicle networking safety communication system which comprises a cloud end, a vehicle end, a roadside end and a pedestrian end. It provides password service function and secure storage function based on a safety module for the communication among each end.

U.S. Pat. No. 10,873,876B2 discloses a communication assurance system that guarantees that valuable information in each V2X wireless message is reliably delivered, even in scenarios where the V2X communication channels are congested. It calculates a series of per-attribute value scores for the piece of information based on the factor data of the piece of information and the context data of the receiver and integrates them to an aggregate value score as the value of the piece of information with respect to the endpoint.

CN109314841A discloses improved quality of service (QoS) support for sending vehicle data via a sidelinks (SL) interface. The application layer generates the vehicle data. The vehicle data are forwarded together with priority indication data and one or more QoS parameters via the SL interface to the transport layer. The transport layer sends the vehicle data based on the received priority indication data and the one or more QoS parameters to one or more receiving devices via the SL interface according to Autonomous Radio resource allocation.

U.S. Pat. No. 10,992,589B2 discloses an apparatus for configuring a UE to assist in mitigating network congestion. It includes a first parameter that indicates an expiration of the data packet and a second parameter that indicates a transmission classification of the data packet. Determining whether a data packet has expired is based on the first parameter and adjusting transmission of the data packet is based on the second parameter, which includes congestion thresholds for determining whether to drop the data packet or to transmit the data packet based on a congestion level.

CN108182817A discloses a trackside end auxiliary system and a vehicle-mounted end auxiliary system to address the problem that environmental information around the vehicle cannot be obtained comprehensively and accurately. The focus here is on the data transmission from RSUs to vehicles.

U.S. Pat. No. 10,212,102B2 discloses an apparatus for storing message and path switching between SL and uplink (UL) for V2X message transmission. It provides a method which includes storing V2X data not transmitted yet on an old path (SL or UL) in a transmission buffer, identifying if data from a SL V2X channel (SVCH) is included in the stored V2X data, re-submitting the stored data to a lower layer of a new path (UL or SL) and transmitting the V2X data based on logical channel prioritization (LCP) procedure to a target of the new path by the path switching layer of the UE which is located right above a packet data convergence protocol (PDCP) layer of the LE.

U.S. Pat. No. 10,992,752B2 discloses sensor deployment mechanisms for road surveillance. The deployment mechanisms minimize the number of required sensors to reduce costs and conserve computing and network resources.

U.S. Pat. No. 10,403,135B2 discloses a reconfigurable roadside network (sensors, CPUs, antennas and communication backbone) that optimizes cooperative automated driving using key performance indicators (KPIs). CPUs will determine the traffic scenario based on measurement data from one or more sensors. The identified traffic scenario may then be used to determine a set of target KPI values. The current KPI values are optimized, and the roadside network is reconfigured based on the identified KPI values.

The related art mostly focuses on safety and efficiency of communication from end-to-end (V2I, V2V, etc.) by physically changing the range of the sensors and communication antennas within a sector or logically changing the mapping of sensors and antennas to CPUs.

To make sure the V2X network's service quality and road safety are not significantly influenced, there is a need to dynamically adjust the transmission frequency of data that are transferred to the V2X system via the one or more 5G channels based on feedback data generated by an edge computing apparatus or system.

OBJECTS OF THE INVENTION

An object of the invention is to mitigate or obviate to some degree one or more problems associated with known systems and methods of improving or increasing network efficiency in a 5G-V2X network.

The above object is met by the combination of features of the main claims; the sub-claims disclose further advantageous embodiments of the invention.

Another object of the invention is to provide a system and method of improving vehicular road safety and/or management of vehicles.

Another object of the invention is to provide a 5G-V2X vehicular communication system based on a defined local geographical area for increasing network efficiency.

Another object of the invention is to provide a multi-tiered system and method for improving road safety and/or management of a vehicle where a local level tier of the multi-tiered system uses edge computing apparatuses or systems to generate feedback data for adjusting the transmission frequency of data of TSDs.

One skilled in the art will derive from the following description other objects of the invention. Therefore, the foregoing statements of object are not exhaustive and serve merely to illustrate some of the many objects of the present invention.

SUMMARY OF THE INVENTION

The present invention relates to traffic data communication in a 5G-V2X network.

The present invention provides an end-to-end V2X network system having a multi-tier system architecture which utilizes information and algorithms performed at a local level tier of the multi-tiered system to generate feedback data for adjusting the transmission frequency of data of at least one TSD.

In particular, the invention proposes a mechanism for dynamically adjusting the transmission frequency of traffic data which is transferred to the 5G-V2X platform via one or more 5G channels based on feedback generated by edge computing nodes such as edge gateway modules (EGW).

The invention concerns a method and system for controlling data transmission in a 5G-V2X network. The 5G-V2X network comprises at least one defined geographical area including a plurality of TSDs. Each of the TSDs is configured to provide data over one or more 5G channels to a V2X processing system comprising a transmission controller (TC) at or through an edge gateway module (EGW) of the defined geographical area. The method comprises the TC dynamically adjusting a data transmission frequency of at least one TSD of said plurality of TSDs in accordance with a transmission control policy. Dynamically adjusting a data transmission frequency of at least one TSD may include restricting the frequency of traffic data transmission by said TSD or increasing the frequency of traffic data transmission by said TSD depending on feedback generated by the TC. The TC may be co-located with the EGW, form part of the EGW, or may comprise a standalone device or apparatus communicatively connected to the ECM by the 5G-V2X network.

In a first main aspect, the invention provides a method of controlling traffic data transmission in a 5G-V2X network. The method comprises provisioning a plurality of TSDs within at least one defined geographical area of the 5G-V2X network, provisioning an EGW for said at least one defined geographical area to be in communication with said plurality of TSDs over one or more 5G channels of said 5G-V2X network, and provisioning each of said TSDs to provide traffic data over said one or more 5G channels to a TC at or via said EGW. The TC dynamically adjusts a traffic data transmission frequency of at least one TSD in accordance with a transmission control policy.

In a second main aspect, the invention provides a system for controlling traffic data transmission in a 5G-V2X network. The system comprises a plurality of TSDs located within at least one defined geographical area and an EGW in communication with said plurality of TSDs over one or more 5G channels of said 5G-V2X network. Each of the TSDs is configured to provide traffic data over said one or more 5G channels to a TC via said EGW or located at said EGW. The TC is configured to dynamically adjust a traffic data transmission frequency of at least one TSD in accordance with a transmission control policy.

In a third main aspect, the invention provides a TC for controlling traffic data transmission in a 5G-V2X network. The TC comprises an empirical analyzer module for processing historical traffic data received from some or all of a plurality of TSDs located within a defined geographical area of said 5G-V2X network. The empirical analyzer module is configured to process said historical traffic data to determine or predict an initial transmission control policy for said plurality of TSDs. The TC includes a real-time analyzer module configured to process real-time traffic data received from some or all of the plurality of TSDs to adjust the initial transmission control policy to provide a dynamic transmission control policy for the plurality of TSDs. The real-time analyzer module is configured to control transmission restriction modules (TRMs) associated with said plurality of TSDs to apply a respective transmission policy for each of said plurality of TSDs.

The summary of the invention does not necessarily disclose all the features essential for defining the invention; the invention may reside in a sub-combination of the disclosed features.

BRIEF DESCRIPTION OF THE DRAWINGS

The foregoing and further features of the present invention will be apparent from the following description of preferred embodiments which are provided by way of example only in connection with the accompanying figures, of which.

DESCRIPTION OF PREFERRED EMBODIMENTS

Figure 1:
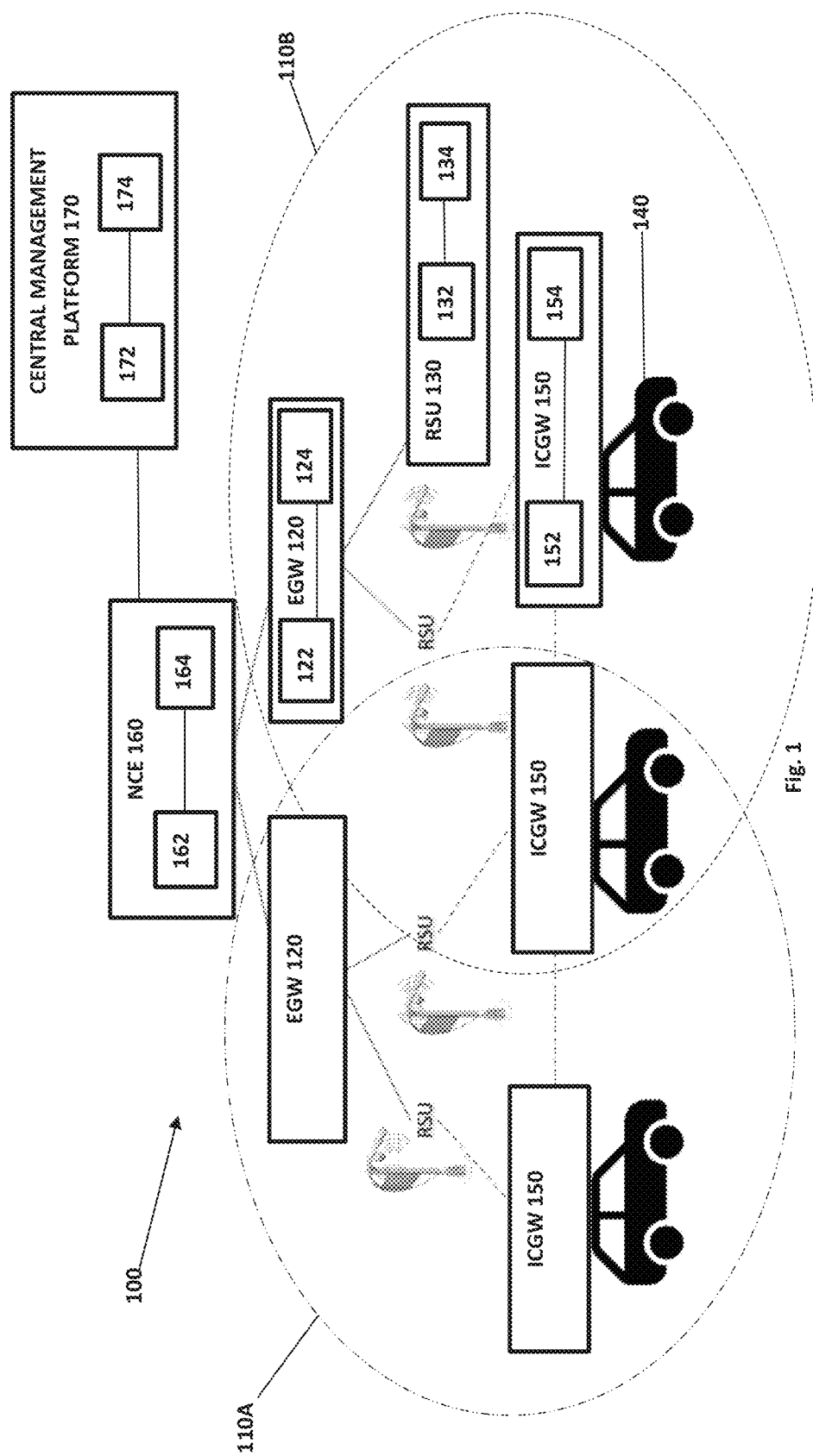
FIG. 1 is a schematic diagram illustrating one embodiment of a road management system.

The following description is of preferred embodiments by way of example only and without limitation to the combination of features necessary for carrying the invention into effect.

Reference in this specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments, but not other embodiments.

It should be understood that the elements shown in the FIGS. may be implemented in various forms of hardware, software or combinations thereof. These elements may be implemented in a combination of hardware and software on one or more appropriately programmed general-purpose devices, which may include a processor, memory and input/output interfaces.

The present description illustrates the principles of the present invention. It will thus be appreciated that those skilled in the art will be able to devise various arrangements that, although not explicitly described or shown herein, embody the principles of the invention and are included within its spirit and scope.

Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of systems and devices embodying the principles of the invention.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The invention as defined by such claims resides in the fact that the functionalities provided by the various recited means are combined. and brought together in the manner which the claims call for. It is thus regarded that any means that can provide those functionalities are equivalent to those shown herein.

In the following description a reference to an "alarm" such be taken as a reference to an "alert" and vice-versa.

Referring to FIG. 1, provided is a schematic diagram illustrating one embodiment of a system 100 in which the AAMS 400 (FIG. 11) may be implemented, although it will be understood that the AAMS 400 may be implemented in any suitable road management systems including V2X based road management systems. The system 100 is preferably a communications network-based system 100 arranged as a plurality of defined local geographical areas 110A, B, each defined local geographical area 110A, B being managed by and/or in data communication with a respective edge gateway module (EGW) 120. Each EGW 120 communicates with a respective NCE 160 and each NCE communicates with a central management platform 170.

The defined local geographical areas 110A, B may overlap as shown in although this is not necessarily the case and it is preferred that any overlaps between adjacent defined local geographical areas 110A, B are arranged to be as small as possible. Each EGW 120 preferably manages and is in communication with a plurality of roadside units (RSUs) 130. Each RSU 130 is preferably arranged alongside, adjacent or near to any one or more of a road, an intersection, a junction, a pedestrian crossing, a set of traffic lights, etc. such that each RSU has a reasonable line of sight to any vehicles located in or passing its near vicinity.

Vehicles 140 which are configured to operate within the network system 100 are each provisioned with a vehicle on-board data processing unit—hereinafter referred to as an in-car gateway module (ICGW) 150. The ICGW 150 may be a stand-alone unit configured to be installable into a vehicle 140 or it may comprise an existing data processing unit of the vehicle 140 having a memory 152 storing machine-readable instructions and a processor 154 for executing said instructions to cause the ICGW 150 to implement appropriate method steps. The ICGW 150 may comprise a V2X on-board unit (V2X-OBU). Each EGW 120 comprises at least a memory 122 for storing machine-readable instructions and a processor 124 for executing said instructions to cause the EGW 120 to implement appropriate method steps. In a similar manner, each RSU 130 comprises at least a memory 132 for storing machine-readable instructions and a processor 134 for executing said instructions to cause the RSU 130 to implement appropriate method steps.

Among other things, each ICGW 150 is preferably configured to provide V2X communication system access and information exchange with other ICGWs 150 and road infrastructure in the defined local geographical area 110A, B, to collect data from the vehicle on-board modules such as, for example, the speedometer and satellite positioning system, directly or indirectly exchange vehicle collected data with other local ICGWs 150, RSUs 130 and its respective EGW 120, use the vehicle collected data and data received from other local ICGWs 150, RSUs 130 and EGW 120 to determine threats and generate alarms, etc., and receive and issue V2X alarms (alerts) and notifications as well as receive traffic status information and recommendations.

Each EGW 120 is preferably configured to at least coordinate multiple RSUs 130 within its respective defined local geographical area 110A, B, monitor traffic in real-time including monitoring traffic congestion and traffic incidents such as accidents, intelligently implement local traffic management, collect data from local infrastructure such as, for example, traffic lights, sensors, cameras, local ICGWs 150 and RSUs 130 and its respective NCE 160, collect policies from its respective NCE 160, and to use collected data to determine threats and generate alarms, etc. Each EGW 120 may be configured to determine from received and processed data specific data to be transmitted to a specific ICGW 150 in dependence on data received at said EGW 120 indicative of one or more parameters related to or associated with a vehicle of said specific ICGW 150. For example, a parameter such a street location may be utilized by the EGW 120 to determine which vehicles within its local geographical area 110A, B need to receive a specific alert, alarm, action or indication of threat.

A plurality of EGWs 120 are preferably managed by and/or in data communication with a respective NCE 160 and, in turn, a plurality of NCEs 160 are preferably managed by and/or in data communication with a central management platform module 170. The system 100 may comprise only a single central management platform module 170 to cover a large geographical region such as, for example a city, a county or a state. Each NCE 160 comprises at least a memory 162 for storing machine-readable instructions and a processor 164 for executing said instructions to cause the NCE 160 to implement appropriate method steps. Similarly, the central management platform module 170 comprises at least a memory 172 for storing machine-readable instructions and a processor 174 for executing said instructions to cause the central management platform module 170 to implement appropriate method steps.

Each NCE 160 is preferably configured to at least intelligently implement regional traffic management, define and provide new and updated traffic policies to the EGWs 120, and coordinate multiple EGWs 120.

The central management platform module 170 is preferably configured to at least intelligently implement whole network traffic management, define traffic strategies for the NCEs 160 and manage and analyze network wide traffic data. The central management platform module 170 may comprise a cloud-based system and may connect to the NCEs 160 via an IP network such as the internet (FIG. 6) or a virtual private network (VPN).

It will be appreciated that the processing power of the central management platform module 170 will likely be very considerably greater than the processing power of any of the NCE 160, EGW 120, RSU 130 or ICGW 150. Despite this, it is envisaged that the central management platform module 170 will operate on high latency data and/or on long data processing periods to provide information related to, for example, road/traffic strategy and planning rather than time critical generation of alerts, determination of actions and/or determination of threats as will be performed at the local EGW 120 and RSU 130 levels.

For enhancing safety alarm generation and/or threat detection accuracy for vehicles, multiple sources of information such as vehicles, pedestrian devices, roadside infrastructure. and communications network(s), etc. are required at low latency signal processing and delivery levels.

The network system 100 comprises a V2X system which preferably utilizes all local available sources of data including, but not limited to vehicle ICGWs 150, pedestrian devices 180 (FIG. 2), road infrastructure systems and devices 190 (FIG. 2) such as traffic lights, traffic cameras, emergency services databases, local authority databases and the like by way of informing EGWs, preferably in real-time, or at least at ultra-low latency, of events, situations or the like which may be relevant to enabling an EGW 120, a RSU 130 and/or a ICGW 150 to determine a threat to a vehicle 140 or another road user and/or to generate an alarm to a vehicle user or another road user.

Figure 2:
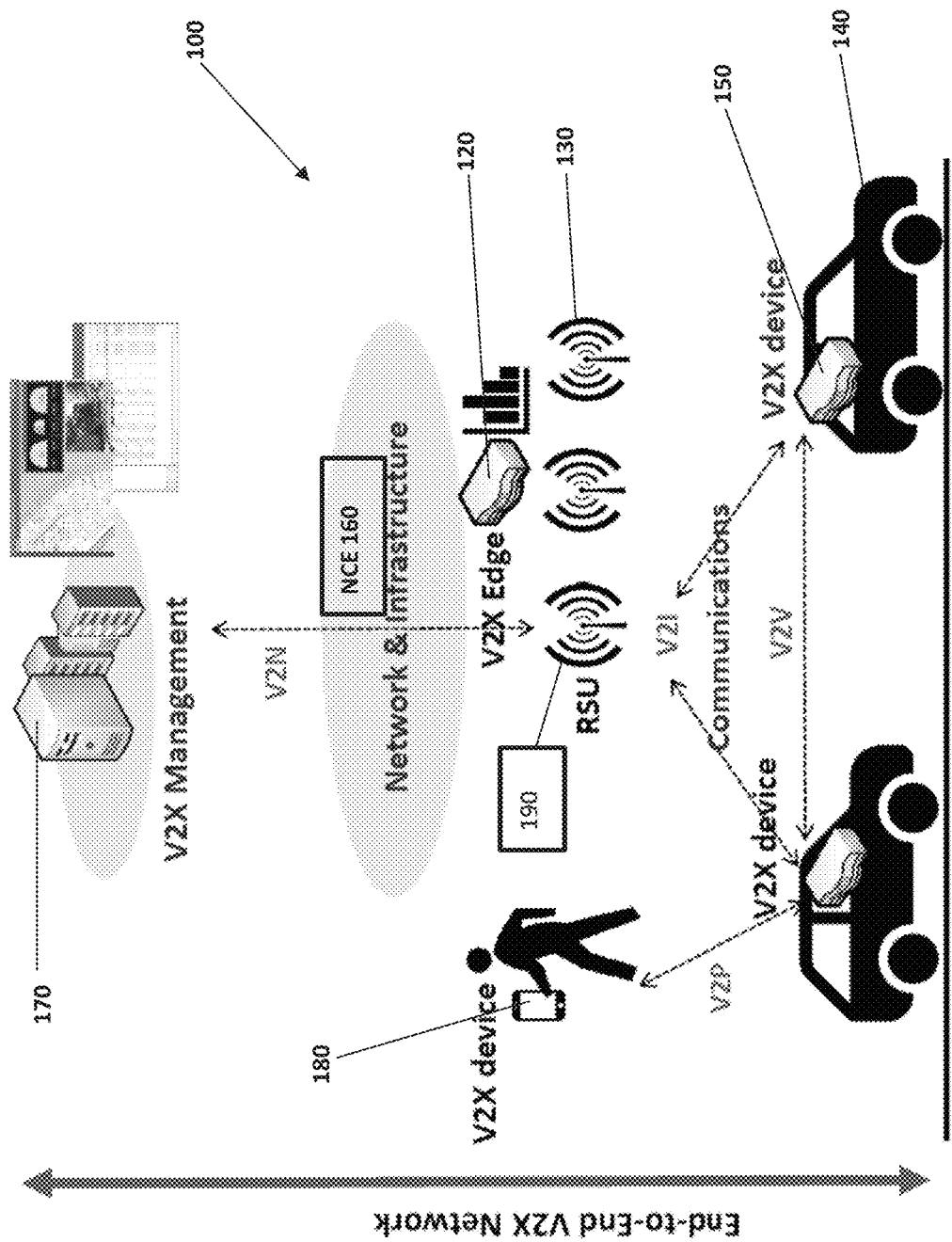
FIG. 2 is a schematic diagram of the system of FIG. 1 showing said system comprising an end-to-end V2X network.

As shown more clearly in FIG. 2, each ICGW 150 may utilize one or more standard. communications interfaces to communicate with other network entities. For example, the ICGW 150 may utilize V2V to exchange data with other ICGWs 150 and/or utilize V2P to exchange data with pedestrian devices 180 and/or utilize V2I to exchange data with local infrastructure including the RSUs 130. The RSUs 130 and EGWs 120 preferably use V2N to exchange data with each other and higher-level network entities such as the NCEs 160 and the central management platform 170 as will be more fully explained hereinafter. Where appropriate, entities in the network system 100 may also utilize V2D and V2G. As such, as illustrated by FIG. 2, an end-to-end V2X network system 100 having a multi-tier system architecture which utilizes information and algorithms performed at different tiers of the V2X network system to enable low latency generation of vehicle/road safety alarms and/or low latency determination of vehicle/road threats.

In the V2X network system 100, the EGWs 120 and/or RSUs 130 are configured to process local, real-time and/or low latency data to assist or provide alarms and/or determine threats to road users. The EGWs 120 and/or RSUs 130 will operate on data having a latency of 100 ms or less and preferably 50 ms or less. A low latency is regarded as comprising a data processing and delivery time in the range of 10 ms to 100 ms.

By confining processing of local real-time and/or low latency data to respective EGWs 120 and/or RSUs 130 on behalf of or in conjunction with ICGWs 150 and/or user devices 180, this enables the system 100 to provide or enable time-critical alarm generation and/or threat determination at the local level without the delays inherent of processing such data at higher level entities in the network system 100. A size of the defined geographical area 110A, B is selected such as to enable data from said one or more RSUs 130 and/or from a respective EGW 120 to be transmitted to said ICGWs 150 in real-time or at least at or less than a first, low level of latency.

In one embodiment, the V2X network system 100 provides a communications channel for at least providing additional data to ICGWs 150 to use in addition to on-vehicle data to generate alarms, to determine threats and/or to determine control actions for the vehicle to be implemented manually or autonomously. The V2X channel provided by the network system 100 is an efficient method of getting time-critical data to ICGWs 150 from local external sources that may affect the vehicle and vice versa.

Figure 3:
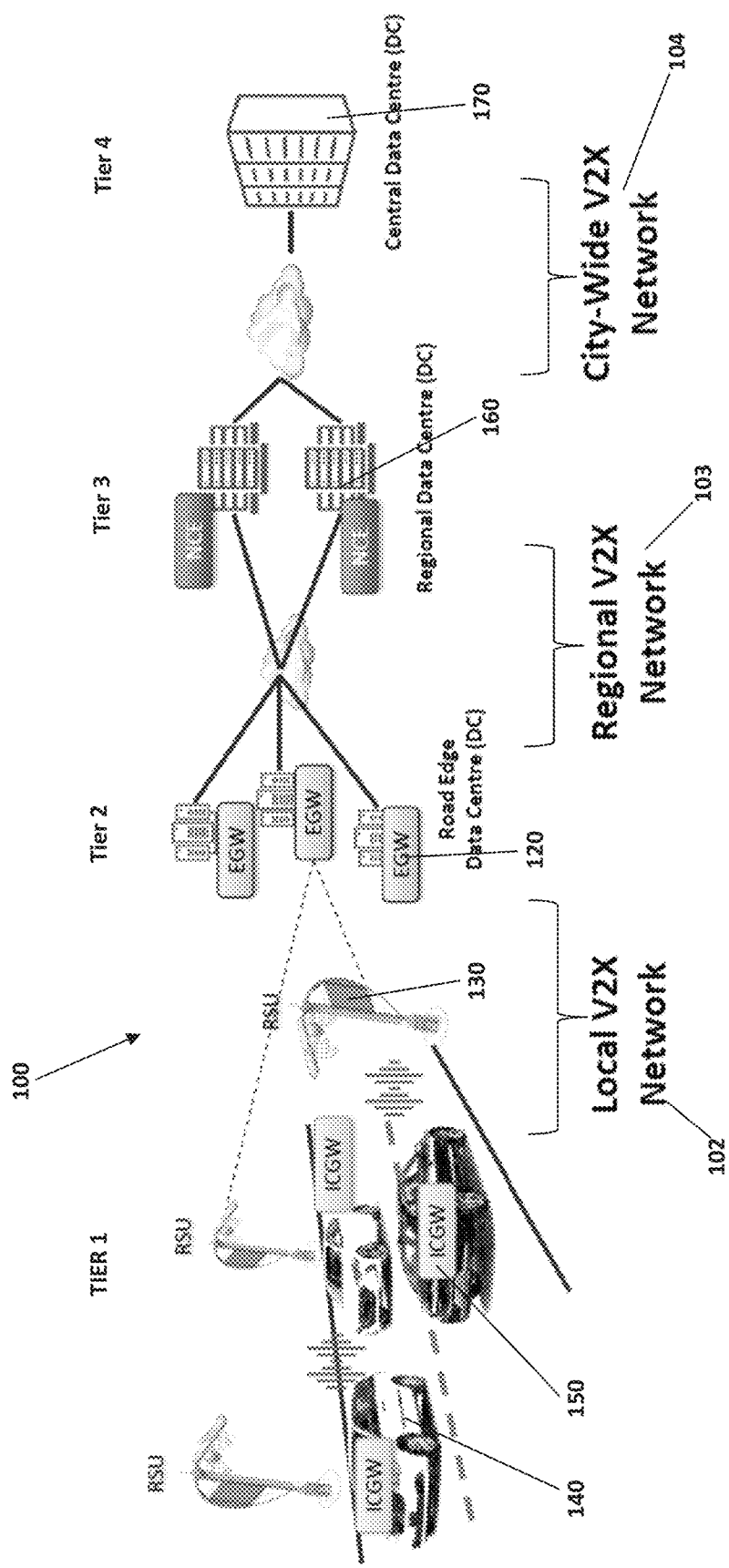
FIG. 3 is a schematic diagram of the system of FIG. 1 showing more clearly the tiered structure of said system.

The multi-tiered arrangement of the network system 100 is more clearly seen from FIG. 3. A first tier can be considered as comprising any vehicles 140 with their associated ICGWs 150 within a geographical area of an EGW 120, any other road users such as pedestrians and their associated devices 180 (FIG. 2), street level infrastructure such as smart traffic lights, camera systems, etc. and the RSUs 130. A second tier of the network system 100 comprises the EGWs 120. The first-tier entities are linked to the second-tier entities by what can be considered as a local V2X network 102 where data communications are exchanged using V2I, V2P and V2V. A third tier of the network system 100 can be considered as comprising the NCEs 160 and these are linked to the second-tier entities by what can be considered as a regional V2X network 103 operating over V2I. A fourth tier comprises the central management platform 170 which communicates using V2I over a city-wide, county-wide or state-wide V2X network 104.

The first and second tier entities preferably operate at signal latencies of 100 ms or less and preferably at signal latencies of 50 ms or less. The third-tier entities preferably operate at signal latencies of 1000 ms or less whereas the fourth-tier entity operates at latencies of greater than 1000 ms and nearer to several seconds to minutes and even longer time periods. Consequently, the system 100 generally relates to a multi-tier V2X network architecture or software system to enable low latency road safety V2X alarm detection/threat determination at a local level whilst using information and algorithms performed at different higher-level tiers of the system operating at different, higher latency levels.

Figure 4:
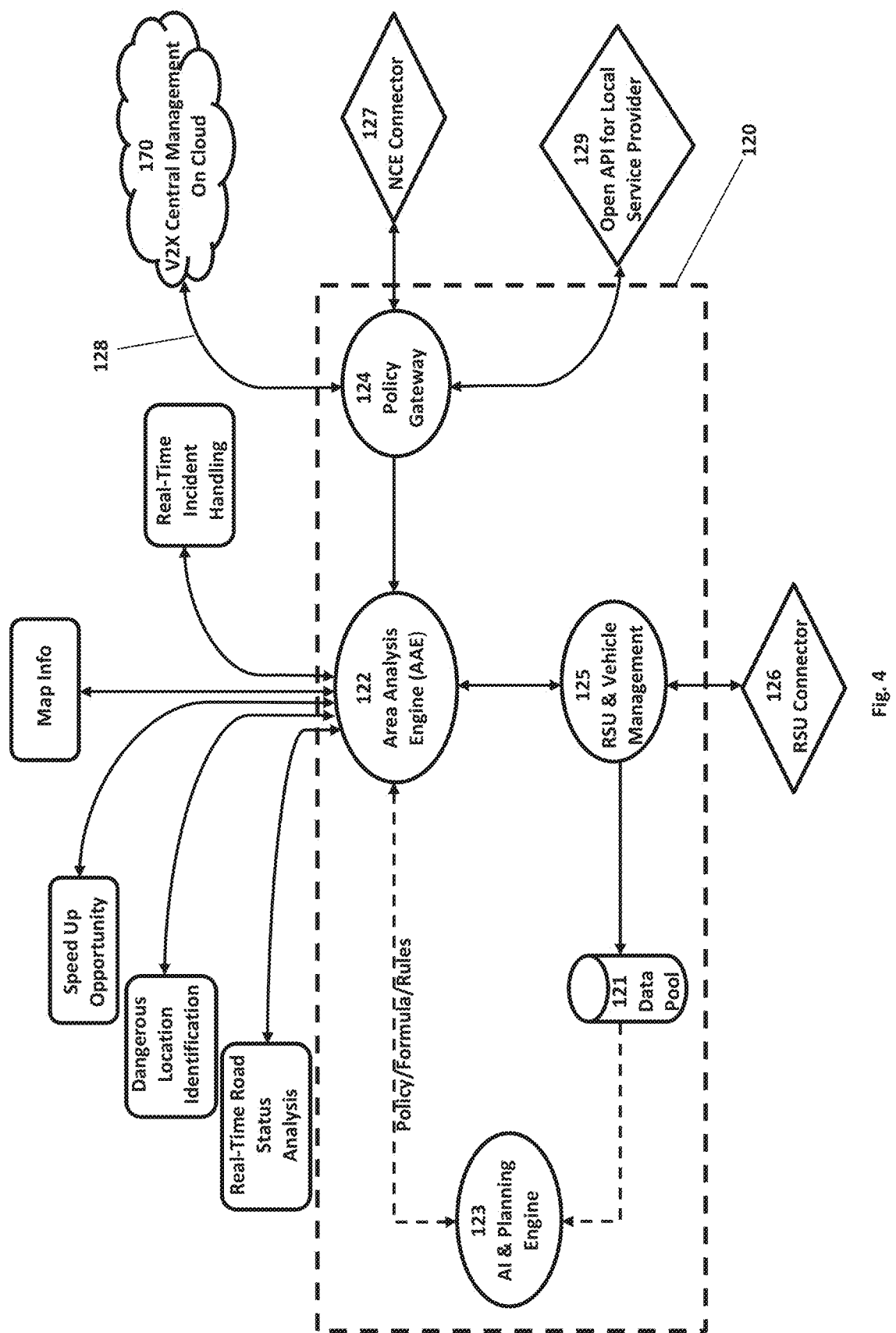
FIG. 4 is a block diagram showing the structure of an edge gateway module for the system of FIG. 1 and illustrating its connections to other entities and some of its information/data inputs.

FIG. 4 illustrates the structure of an EGW 120 and its connections to other system entities and some of its information/data inputs. The EGW 120 comprises a database or data pool 121, an area analysis engine module (AAE) 122, an artificial intelligence (AI) planning engine module 123, a policy gateway module 124 and an RSU and vehicle management module 125. Data connectors may include a data connector 126 to one or more RSUs 130, a data connector 127 to an NCE 160 and optional data connectors 128, 129 to the central management platform 170 and an external service provider. Data inputs to the AAE 122 may include map data, real-time incident handling data, real-time road status analysis data, dangerous location identification data, and vehicle speed-up opportunity data.

The AI and planning engine module 123 is a software module within the EGW 120 configured to aggregate all data generated in the defined geographical area 110A, B of the EGW 120 and process said data using machine learning. The AAE 122 is a software module within the EGW 120 configured to process data generated in the defined geographical area 110A, B to determine any one or more of: real-time status of all roads in the defined geographical area; real-time status of all resources in the defined geographical area; real-time status of all RSUs 130 in the defined geographical area; real-time status of all ICGWs 150 in the defined geographical area; and real-time status of all incidents in the defined geographical area. The policy gateway module 124 is a software module within the EGW 120 configured to receive and configure rules and policies from the NCE 160 or from the central management platform 170, and to receive policy information from a local service using open standard Application Programming Interface (API). For example, local shops could send current retail and promotion information to broadcast to vehicles as low priority promotional information. The RSU and vehicle management module 125 is a software module within the EGW 120 configured to communicate data to the RSUs 130 and ICGWs 150 including real-time status information as described above and to configure at least the RSUs 130 in accordance with any policies received by the EGW 120.

Figure 5:
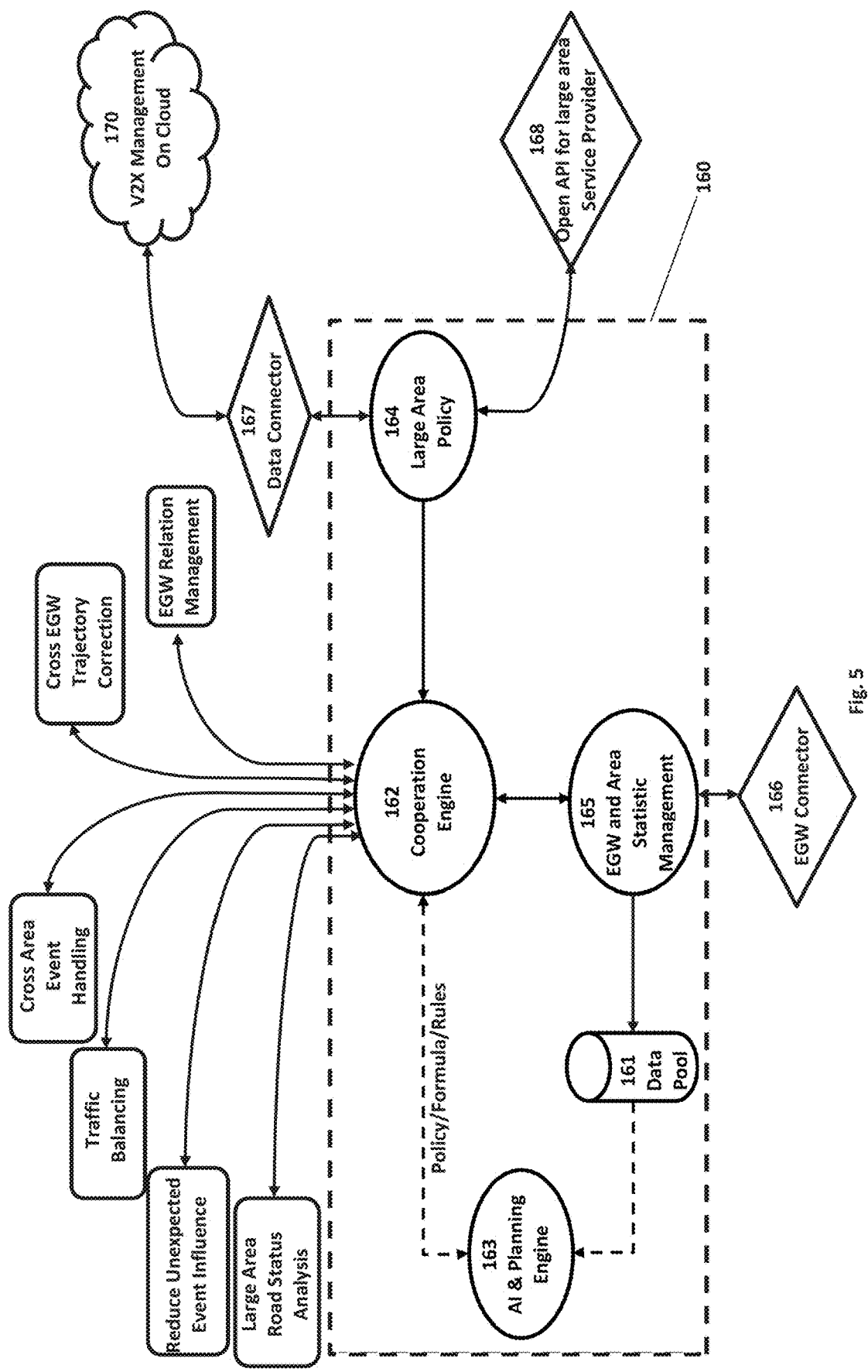
FIG. 5 is a block diagram showing the structure of a network cooperation engine (NCE) module for the system of FIG. 1 and illustrating its connections to other entities and some of its information/data inputs.

FIG. 5 illustrates the structure of an NCE 160 and its connections to other system entities and some of its information/data inputs. The NCE 160 comprises a database or data pool 161, a cooperation engine module 162, an artificial intelligence (AI) planning engine module 163, a large area policy gateway module 164 and an EGW and area statistics management module 165. Data connectors may include a data connector 166 to one or more EGWs 120, a data connector 167 to the central management platform 170 and optional data connector 168 to a large area external service provider. Data inputs may include EGW relationship data which describes the relationship such as relative positions of one EGW to another, cross ECM trajectory correction data, cross area event handling data, traffic balancing data, reduce unexpected event influence data, and large area road status analysis data.

Each EGW 120 managed by the NCE 160 is configured to communicate its local data for aggregation and extraction by the NCE 160 where the NCE 160 processes the aggregated and extracted data to provide one or more of: road management policy for the EGW defined geographical areas; regional traffic management for the EGW defined geographical areas; and coordinate and manage said plurality of EGWs. The cooperation engine module 162 is a software module within the NCE 160 configured to receive the data inputs and to process the EGW relationship data, the cross EGW trajectory correction data, the cross-area event handling data, traffic balancing data, and the reduce unexpected event influence data. It may also process the large area road status analysis data. The artificial intelligence (AI) planning engine module 163 is a software module within the NCE 160 configured to take all data uploaded from the EGWs 120 into the data pool 161 and to apply machine learning to such data. The machine learning may comprise supervised learning and may be done off-line. One output of the artificial intelligence (AI) planning engine module 163 includes policies, formulas and rules for the cooperation engine module 162 to apply. The artificial intelligence (AI) planning engine module 163 may also be configured to try and determine any relationships between any of the EGWs 120 to assist the cooperation engine module 162 to determine an area or region influenced or affected by, for example, a traffic incident. It will be understood that traffic congestion, for example, in one defined geographical area 110A, B will likely have greater influence or effect on an adjacent local area 110A, B than it would have on a more remote area. The large area policy gateway module 164 is a software module within the NCE 160 configured to receive configuration/rules/policies data from the V2X central management platform 170 and may also be configured to receive policy data from a large area service provider through an open standard API. The EGW and area statistics management module 165 is a software module within the NCE 160 configured to receive data from the cooperation engine module 162 and transmit such data to respective EGWs 120.

Figure 6:
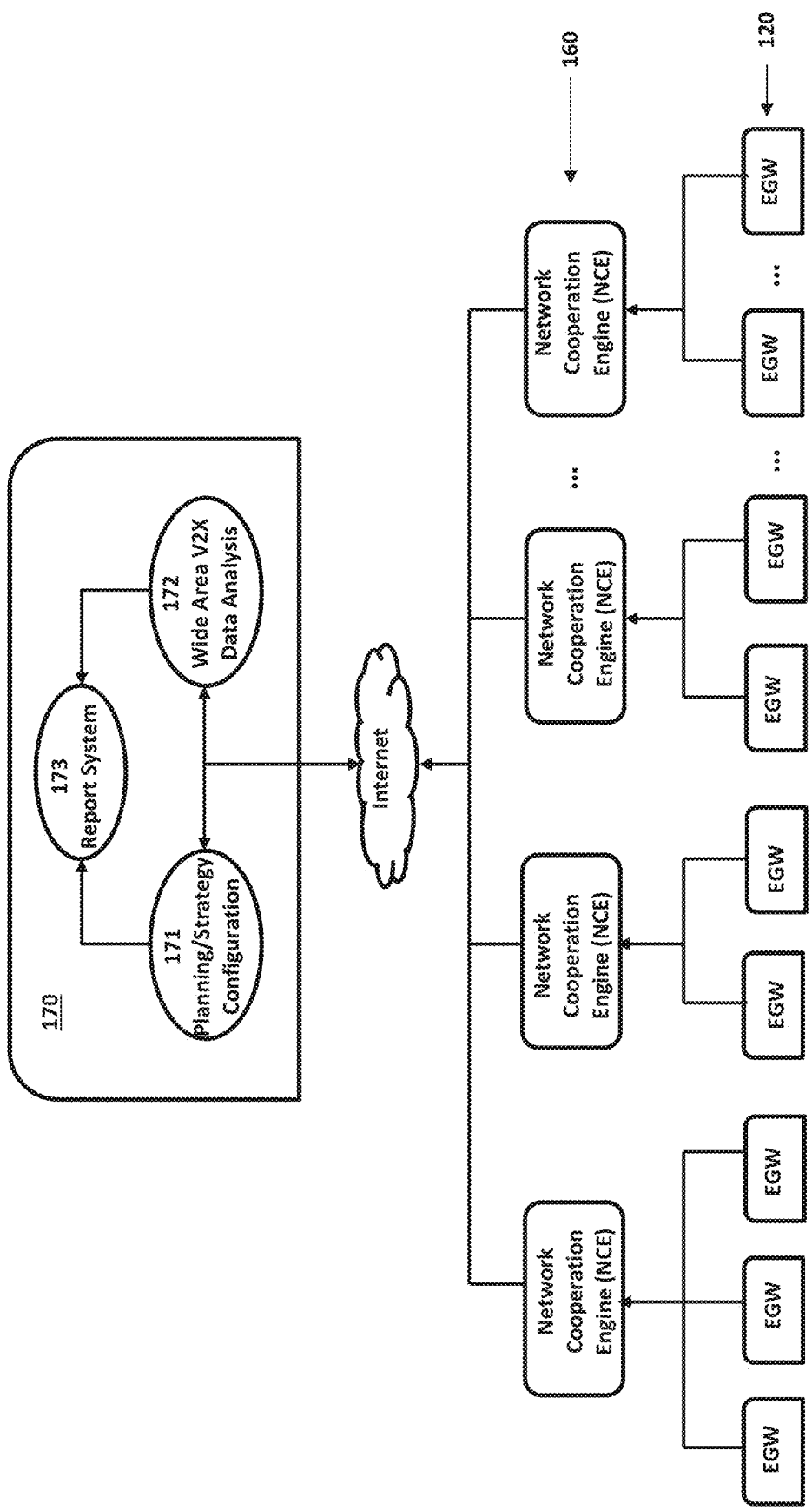
FIG. 6 is a block diagram showing the structure of a central management platform module for the system of FIG. 1 and illustrating its connections to other entities.

FIG. 6 illustrates the structure of the central management platform 170 and its connections to other system entities and some of its information/data inputs. The central management platform module 170 is in direct communication with a plurality of NCEs 160 and indirectly in communication with a plurality of EGWs 120. The central management platform module 170 comprises a planning/strategy configuration module 171, a wide area V2X data analysis module 172 and a report system module 173. The modules 171, 172 and 173 comprise software modules within the central management platform module 170. The central management platform module 170 aggregates and extracts data from the NCEs 160 and the EGWs 120 and processes the aggregated and extracted data to provide one or more of: road management policy for the defined geographical areas 110A, B of the EGWs 120; regional traffic management across NCB 160 for the defined geographical areas 110A, B of the EGWs 120; directly coordinate said plurality of NCEs 160 and indirectly coordinate said plurality of EGWs 120; provide centralized management of the NCEs 160, EGWs 120 and RSUs 130; provide centralized management of the plurality of data sources located within each defined geographical area 110A, B; provide centralized vehicle to everything (V2X) network management; provide traffic analysis for the defined geographical areas 110A, B; and provide regional traffic analysis for the NCEs 160.

Figure 7:
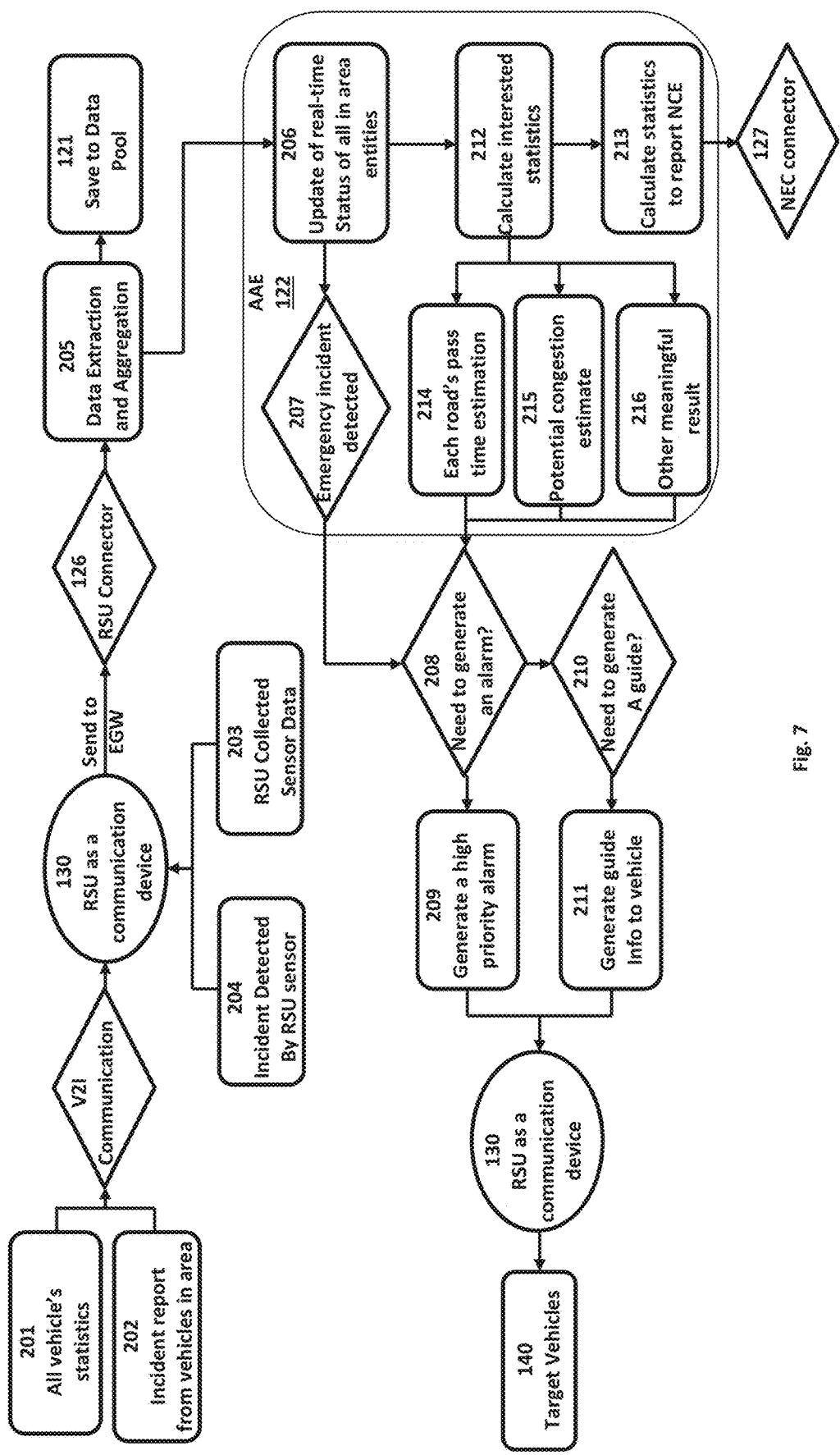
FIG. 7 is a flow diagram of the information flows and processes performed by an edge gateway module for the system of FIG. 1.

Referring to FIG. 7, provided is a flow diagram of the information flows and processes performed by an EGW 120. At 201, statistical data from the ICGWs 150 of all vehicles 140 located within the geographical area 110A, B of the EGW 120 together with, at 202, any incident report data from such ICGWs 150 are transmitted by V2I through a respective RSU 130 to the RSU data connector 126 of the EGW 120. At 203, data collected by a respective RSU 130 from associated data sources within the geographical area 110A, B are transmitted to the data connector 126 of the EGW 120 together with, at 204, any incident data detected by sensors of the RSU 130. At 205, data received at the data connector 126 is aggregated and stored in the data pool 121. Some or all of the aggregated data are passed to the AAE 122 which performs a few functions including, at 206, updating the real-time statuses of all in-area entities. If, at 207, the updating step 206 identifies or detects an emergency incident, data describing the incident are forwarded to 208 to determine, for example, if there is a need to generate an alarm. In the event that it is determined at 208 that there is a need to generate an alarm, a further determination may be made at 209 as to whether or not it is necessary for the alarm to be considered a high priority alarm. In either case, alarm data are communicated via respective RSUs 130 to target vehicles 140. It will be understood that this is done in real-time or at least with very low latency of less than 100 ms. Furthermore, if at 208 it is determined that there is a need to generate an alarm, the method may include at 210 determining whether or not to generate guidance data or even action data for vehicles 140. This may include at 211 determining guidance data or action data for specific vehicles 140 in the geographical area 110A, B. Such guidance data or action data are communicated via respective RSUs 130 to target vehicles 140. Action data may comprise data which causes a target vehicle 140 to autonomously act without human involvement. For example, action data may cause a target vehicle to autonomously slow prior to reaching a pedestrian crossing if pedestrians have been sensed as being on or near the crossing and, more particularly, where pedestrians have been sensed as being on or near the crossing in vulnerable positions.

In addition to determining or detecting at 207 an emergency incident, the AAE 122 may be configured to calculate at 212 useful statistics such as traffic statistics and may include determining at 213 useful statistics to be transmitted to one or more NCEs 160. The statistical data generated at 212 may in turn be used at 214 to calculate a traffic pass time for each road in the geographical area 110A, B, at 215 to calculate potential congestion times, and at 216 calculate other meaningful statistics or parameters for the traffic situation in the geographical area 110A, B. The data generated at each or any of 214, 215 and 216 may also be used generate alarms and/or guidance/actions for targeted vehicles 140. Guidance data and/or action data may also be communicated target vehicles 140 via other vehicles using V2V.

Figure 8:
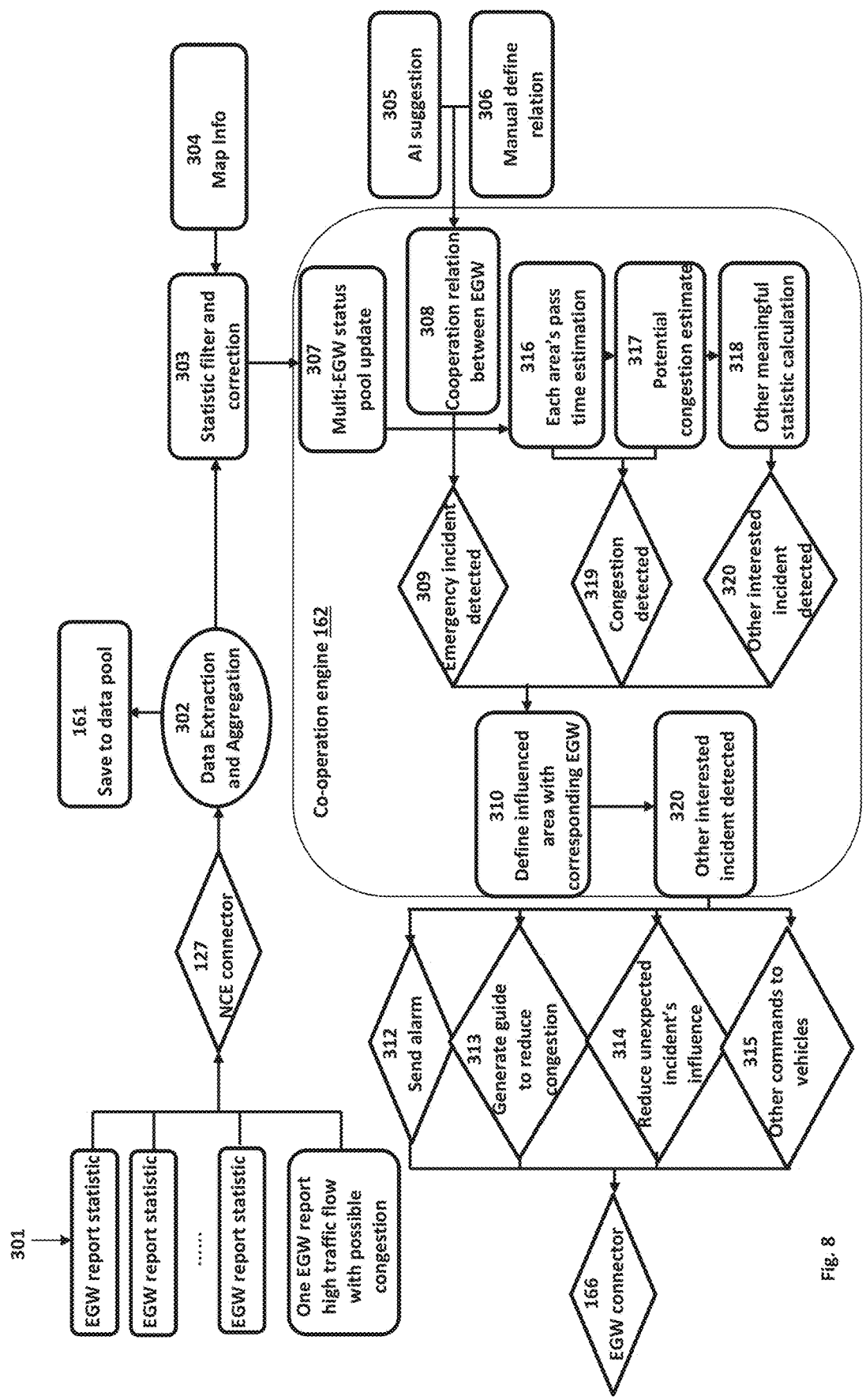
FIG. 8 is a flow diagram of the information flows and processes performed by a NCE module for the system of FIG. 1.

Referring to FIG. 8, provided is a flow diagram of the information flows and processes performed by an NCE 160. At 301, each EGW reports statistical data including, but not limited to, status report data, incident report data and congestion report data and transmits said data to its NCE data connector/interface 127 (NCE EGW data connector 166). At 302, said data is aggregated and stored in the NCE data pool 161. Some or all of said aggregated data are forwarded to the cooperation engine module 162, although, in an optional step at 303, said data may be filtered and corrected. Furthermore, map data may be input at 304. At 305 optional data inputs to the cooperation engine module 162 may include AI suggested inputs from any one of the EGW artificial intelligence (AI) planning engine module 123, the NCE artificial intelligence (AI) planning engine module 163, the central management platform planning/strategy configuration module 171, the wide area V2X data analysis module 172 or the report system module 173. At 306, optional data inputs to the cooperation engine module 162 may include manually defined relationship data such as, for example, the spatial relationships between EGWs 120 and their respective geographical areas 110A, B.

At 307, the cooperation engine module 162 receives multi-EGW status data from the EGW data pools 121. Based on this data and optionally on EGW relationship data received at 308, the cooperation engine module 162 may determine at 309 if any emergency incident has been detected and, if so, to define at 310 the area or areas and corresponding EGWs 120 affected by the incident and to define actions and/or alarms to trigger for each affected EGW 120. The actions and/or alarms may comprise, although are not limited to: 312 "send an alarm"; 313 "generate guide to reduce congestion"; 314 "reduce unexpected incident's influence"; and 315 "other commands to vehicles". Once the actions and/or alarms are determined, these are issued to affected EGWs 120 via the EGW data connector/interface 166.

The cooperation engine module 162 may also use the multi-EGW status data and optionally the EGW relationship data to estimate any one or more of 316 each EGW area's pass time, 317 each EGW area's estimated potential congestion, and 318 other meaningful statistical data. The EGW area's pass time and EGW area's estimated potential congestion can be used at 319 to determine if congestion is detected and to use this data to define at 310 the area or areas and corresponding EGWs 120 affected by the incident and to define actions and/or alarms to trigger for each affected EGW 120. The other meaningful statistical data can be used at 320 to determine any other detected incident and to also use this data to define at 310 the area or areas and corresponding EGWs 120 affected by the incident and to define actions and/or alarms to trigger for each affected EGW 120.

In the following description, the AAMS 400 will be described as being implemented in the system 100 of FIGS. 1 to 8 and like numerals will be used to denote like parts. However, it will be understood that the AAMS 400 may be implemented in any suitable road management system.

Figure 9:
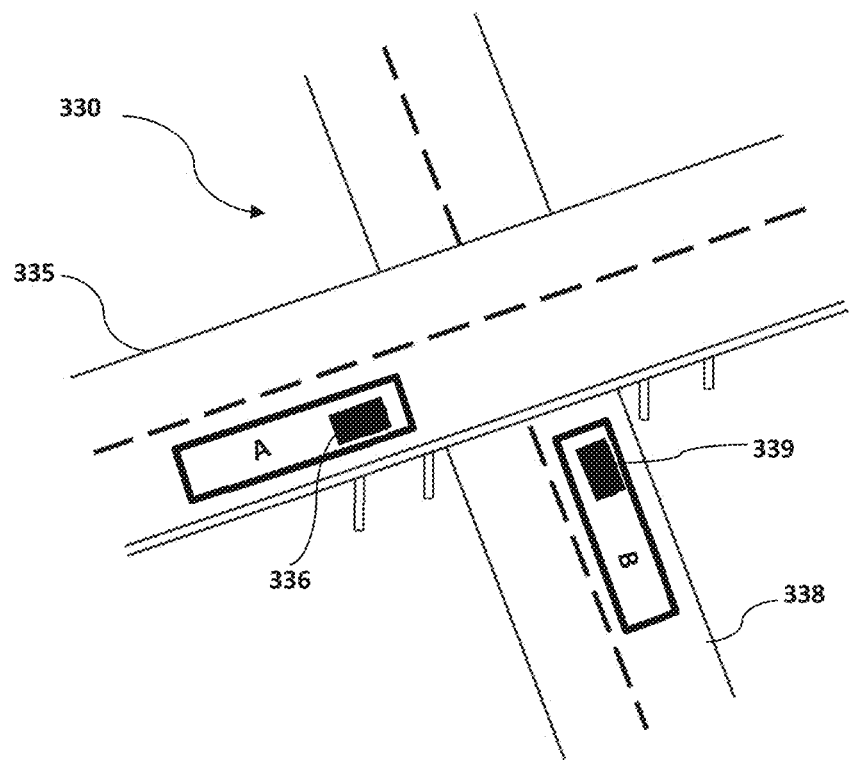
FIG. 9 illustrates an example of how a vehicle generated false alert may arise.

Referring to FIG. 9, shown is an intersection 330 of a first carriageway (road) 335 with a second carriageway 338. However, in this example, the two carriageways 335, 338 do not physically intersect and form a junction because the first carriageway 335 is elevated and crosses over the second passageway 338 such that traffic on the first carriageway 335 does not directly impede traffic on the second carriageway 338 or vice-versa. In contrast, in a scenario where the first and second carriageways 335, 338 do physically intersect to form a junction (not shown), it would be necessary to have traffic control devices such as traffic lights at the junction of the two carriageways 335, 338 to control traffic flows.

In the example scenario of FIG. 9, a first vehicle 336 in box A on the first carriageway 335 may detect the presence of another vehicle 339 in box 13 on the second carriageway 338 and issue an alert to the driver of the first vehicle 336 to be aware of the near proximity of the second vehicle 339. However, it will be understood that such an alert would be redundant as the detected proximity of the first and second vehicles 336, 339 is not relevant from a traffic management/safety point of view as there is no possibility of the first and second vehicles 336, 339 colliding, for example. The alert would therefore constitute a false alert to the driver of the first vehicle 336. A probability of such a false alert being issued may be higher in the case where the first vehicle 336 has entered the defined geographical area containing the cross-over intersection 330 of the first and second carriageways 335, 338 for the first time and particularly if the first vehicle 336 does not have or has not yet received updated map data and/or static environmental data and/or sensor data for the defined geographical area or at least the area surrounding the cross-over intersection 330. In this example scenario, the first vehicle 336 has limited data by which to process the detected near proximity of the second vehicle 339 and to determine if an alert needs to be issued to the driver. Furthermore, in this example scenario, other vehicles (not shown) not having relevant map data and/or static environmental data and/or sensor data may also issue intersection alerts not only to their respective drivers but to the system 100 entities such as the RSUs 130 and EGWs 120. The generation by vehicles of such false alerts is undesirable for many reasons.

Figure 10:
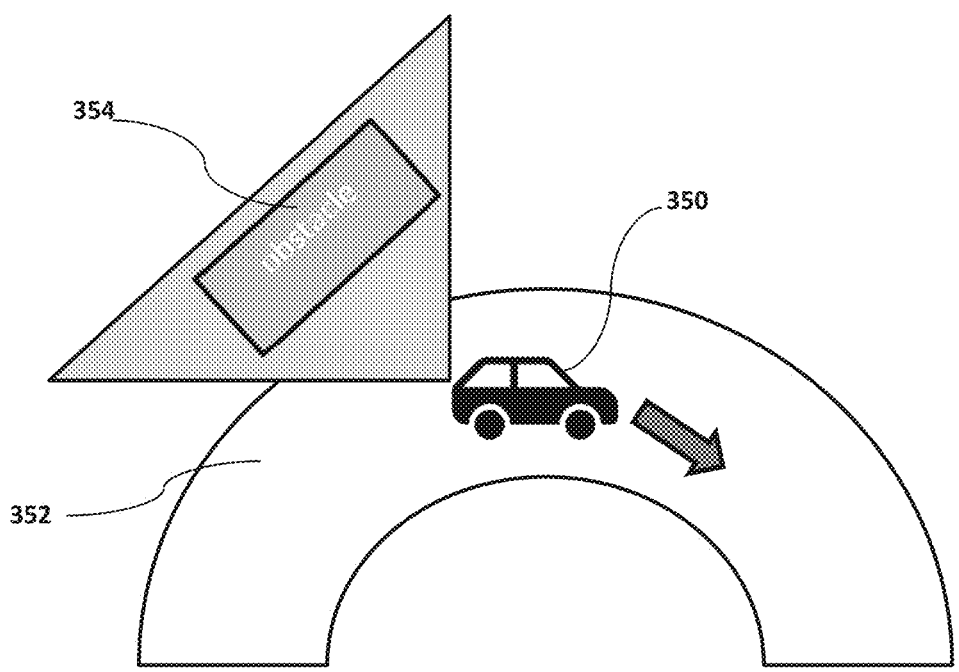
FIG. 10 illustrates another example of how a vehicle generated false alert may arise.

In the example scenario of FIG. 10, a first vehicle 350 is travelling around a curved part of a carriageway 352 or around a roundabout and, as it does so, it detects near proximity of a roadside object or obstacle 354 in one of the vehicle's blind spots and falsely identifies the object or obstacle 354 as another vehicle and issues, in this example scenario, a left-side blind spot alert to the vehicle driver. Once again, in this example scenario, it can be seen that the issued alert is a false alert, issuance of which could have been prevented or at least at a reduced occurrence of such false alerts if vehicles had received relevant map data and/or static environmental data and/or sensor data indicating the presence of the object or obstacle 354.

The AAMS 400 is configured to receive vehicle generated alerts and to use any of relevant map data and/or static environmental data and/or sensor data to determine if a vehicle generated alert is a false alert and to then communicate data about or related to the false alert to other vehicles 140 and user devices 180 via RSU 130 in the system 100 so as to reduce or even prevent similar such false alerts being issued thereafter.

Figure 11:
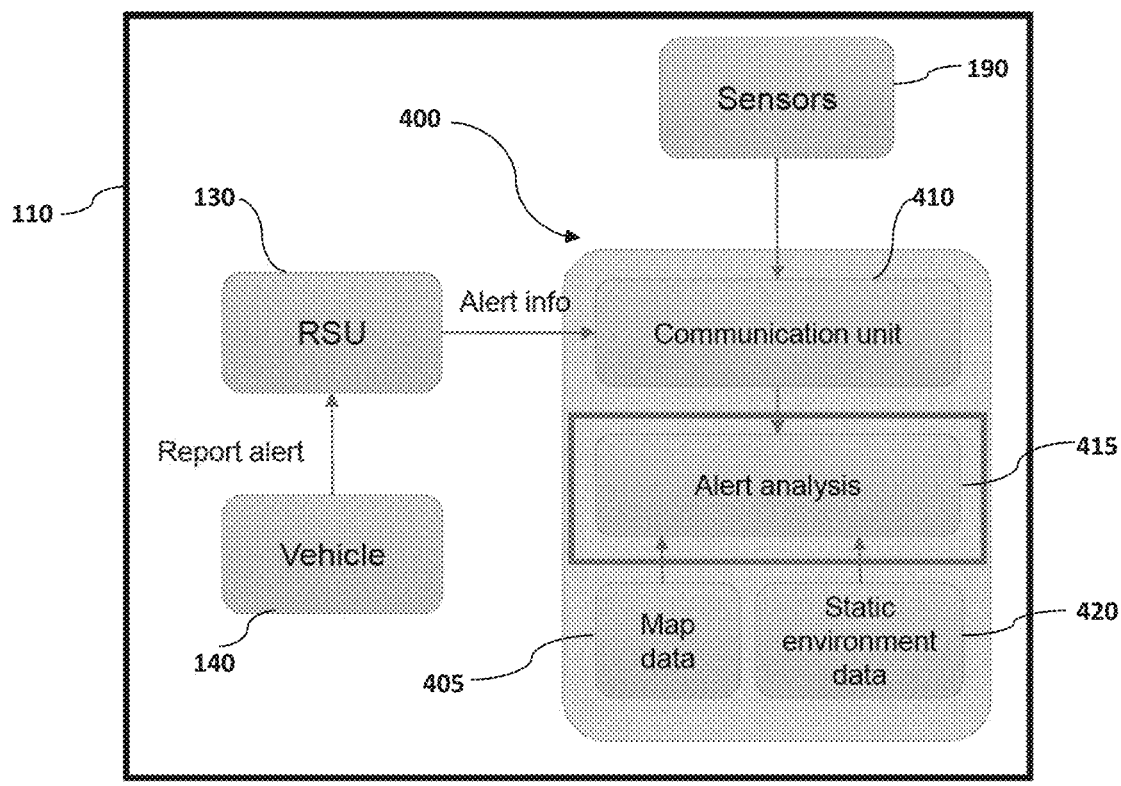
FIG. 11 is a block diagram showing the structure of an area alert management system (ARMS) which can be deployed in a road management system including the road management system of FIGS. 1 to 8.

Referring now to FIG. 11, shown is a block diagram of the AAMS 400 and its connections to some of the other entities 130, 190 in the system 100. The black box surrounding the AAMS 400 can be considered as defining the defined geographical area 110 containing the at least one RSU 130 but it will be understood that the diagram is not to scale and that the defined geographical area 110 could be much larger than shown and containing within it a plurality of RSUs 130, a plurality of roadside sensors 190 such as road infrastructure systems and devices and at least one EGW (not shown).

The AAMS 400 comprises a map data unit 405 comprising map data for the defined geographical area 110 or at least the area surrounding the at least one RSU 130. The AAMS 400 is shown connected to the at least one RSU 130, although it will be understood that the AAMS 400 may comprise a part of the EGW 120 and may be implemented through machine code stored in the memory 122 and executable by the processor 124 of the EGW 120. In other embodiments, the AAMS 400 may comprise a stand-alone apparatus communicatively connected to the RSU 130 via, for example, the V2X network 102, 103, 104 and communicatively connected to one or more of the roadside sensors

190. Preferably therefore the AAMS 400 has a communication unit 410 for managing communications between the AAMS 400 and the system entities such as the RSUs 130 and roadside sensors 190. The AAMS 400 also has an alert analysis unit 415 configured to receive vehicle generated alerts. The AAMS 400 preferably includes a static environment data unit 420 comprising static environmental data for the defined geographical area 110 or at least the area surrounding the at least one RSU 130.

It will be understood that all or any of the units comprising the AAMS 400 can be implemented by machine code stored in a memory device and executable by a processor.

In a first method, the alert analysis unit 415, upon receiving a vehicle generated alert, processes the received vehicle generated alert to determine if the alert is a false alert. The alert analysis unit 415 is configured to use a location associated with the vehicle generated alert to obtain map data from the map data unit for a defined area surrounding the vehicle generated alert location and/or use a location associated with the vehicle generated alert to obtain static environmental data for the defined area surrounding the vehicle generated alert location and/or retrieve sensor data for the defined area surrounding the vehicle generated alert location based on the location and time of the vehicle generated alert. The defined area surrounding the vehicle generated alert location may be of a predetermined size much smaller than the size of the defined geographical area 110 or may have a dynamically determined small size dependent on the relative locations/positions of system entities such as RSUs 130 and/or roadside sensors 190 which are deemed relevant to the generation by a vehicle of the received alert. There are a number of ways in which the size of the area surrounding the vehicle generated alert location is determined either statically or dynamically and this could include taking into account locations and/or clusters of previously determined false alerts.

In any event, the alert analysis unit 415 determines if the received vehicle generated alert is consistent with the obtained and/or retrieved data for the defined area surrounding the vehicle generated alert location. In the example scenario of FIG. 9, the alert analysis system 415 might determine a lack of consistency with relevant map data for a received vehicle generated intersection alert because the first carriageway 335 crosses over the second carriageway 338, i.e., they do not, in fact, intersect each other at a junction. Or, in the example scenario of FIG. 10, the alert analysis system 415 might determine a lack of consistency with relevant static environmental data for a received vehicle generated blind spot alert because the static environmental data includes data defining the position and possibly also the type of roadside object or obstacle 354. The alert analysis unit 415 records that the received vehicle generated alert is a false alert when it is determined that the received vehicle generated alert lacks consistency with the relevant obtained and/or retrieved data for the defined area surrounding the vehicle generated alert location. The alert analysis unit 415 may also employ roadside sensor data for the defined area surrounding the vehicle generated alert location either by itself or in any combination with the relevant map data and the relevant static environmental data. An example scenario may be where the received vehicle generated alert has detected a pedestrian at a road crossing or a cyclist riding a bicycle along an outside margin of a carriageway but where the relevant roadside sensor data show that the detection is in error or that the cause of the detection is no longer present, e.g., the pedestrian has exited the road crossing onto the pavement and the generated alert is a false alert.

Figure 12:
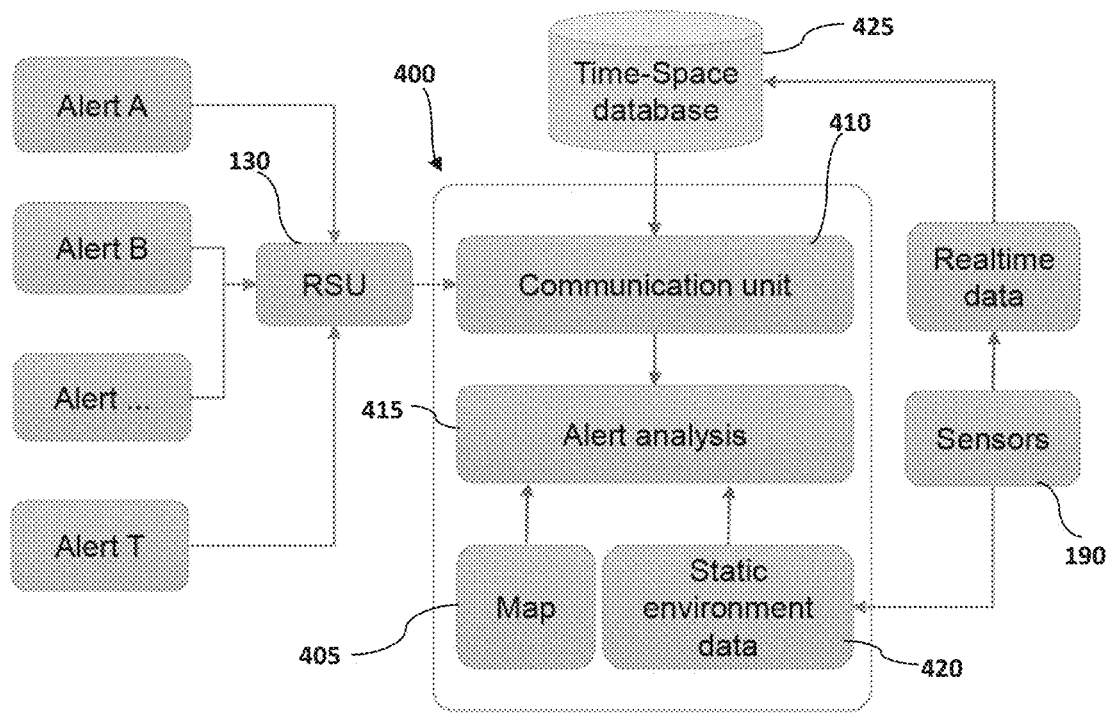
FIG. 12 illustrates some of the data paths between the AAMS and other system entities in the road management system.

Referring to FIG. 12, illustrated are some of the data paths between the AAMS 400 and other system entities in the road management system 100. It can be seen that the AAMS 400 preferably receives vehicle generated alerts via the at least one RSU 130. This has at least the advantage of enabling the RSU 130 to process the alerts in the manner described with respect to the system 100 of FIGS. 1 to 8 as well as enabling the RAMS 400 to process said received vehicle generated alerts to determine whether or not any of such received alerts present as false alerts. The received alerts may comprise alerts of different types denoted, by way of example, as "A", "B" or "T" in FIG. 12. FIG. 12 also illustrates that the roadside sensors 190 may communicate data to update the static environmental data managed by the static environment unit 420. Furthermore, real-time sensor data or stored sensor data can be communicated to a "time-space" or a "time-location" database 425 which stores roadside sensor data by location and time when generated and possibly also by other parameters such as event type, etc.

Figure 13:
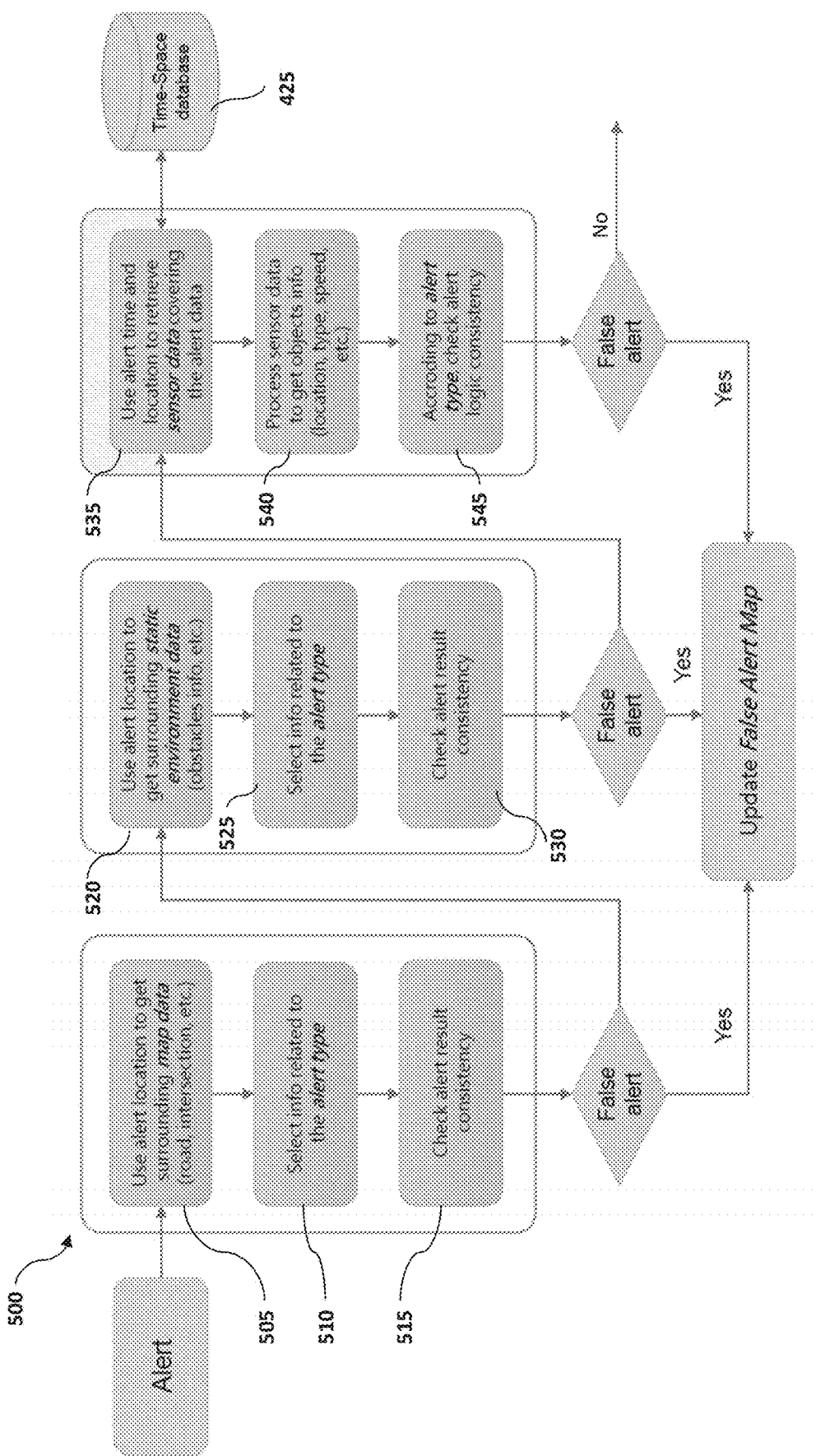
FIG. 13 is a flow diagram illustrating one method of determining whether or not a vehicle generated alert is a false alert.

Referring to FIG. 13, shown is a flow diagram illustrating of another method 500 of reducing vehicle generated false alerts. In a first step 505 of the method 500, the alert analysis unit 415, upon receiving a vehicle generated alert, uses the location associated with the vehicle generated alert to obtain map data from the map data unit 405 for the defined area surrounding the vehicle generated alert location. The obtained map data may include any of properties and locations of roads, locations and types of intersections, positions and locations of traffic signals, boundaries, and the like. In a second step 510, the alert analysis unit 415 uses the type of the received vehicle generated alert and obtains only map data from the map data unit 405 for the defined area surrounding the vehicle generated alert location that is related or relevant to the type of the received vehicle generated alert. In any event, in a third step 515, the alert analysis unit 415 then determines if the received vehicle generated alert is consistent with the relevant map data for the defined area surrounding the vehicle generated alert location. If, in the third step 515, the alert analysis unit 415 determines a lack of consistency between the received vehicle generated alert and the relevant map data, it records that the received vehicle generated alert is a false alert and generates a false alert map and/or updates the false alert map data in the map data unit 405. The AAMS 400 may also communicate the false alert and/or the false alert map data to the at least one RSU 130 and/or to the one or more ICGWs 150 of vehicles 140 and/or to the one or more V2X devices 180 in the defined geographical area 110 or in the coverage area of the RSU 130 or in the defined area surrounding the vehicle generated alert location. The updated false alert data may comprise for any false alert any or more of: location such as global positioning system (GPS) location data; type such as, for example, intersection alert; and/or reason such as "not an intersection" for example.

If, in the third step 515, the alert analysis unit 415 does not determine a lack of consistency between the received vehicle generated alert and the relevant map data, the method moves to a fourth step 520 where the alert analysis unit 415 obtains static environmental data for the defined area surrounding the vehicle generated alert location from the static environment data unit 420. The static environmental data may comprise data defining any feature which is generally non-changing in time such as static objects and obstacles and may include, for example, long standing roadworks and the like. In a fifth step 525, the alert analysis unit 415 uses the type of the received vehicle generated alert and obtains only static environmental data from the static environment data unit 420 for the defined area surrounding the vehicle generated alert location that is related or relevant to the type of the received vehicle generated alert. In any event, in a sixth step 530, the alert analysis unit 415 then determines if the received vehicle generated alert is consistent with the relevant static environmental data for the defined area surrounding the vehicle generated alert location. If, in the sixth step 530, the alert analysis unit 415 determines a lack of consistency between the received vehicle generated alert and the relevant static environmental data, it records that the received vehicle generated alert is a false alert and generates a false alert map and/or updates the false alert map data in the map data unit 405. The AAMS 400 may also communicate the false alert and/or the false alert map data to the at least one RSU 130 and/or to the one or more ICGWs 150 of vehicles 140 and/or to the one or more user devices 180 in the defined geographical area 110 or in the coverage area of the RSU 130 or in the defined area surrounding the vehicle generated alert location.

If in the sixth step 530, the alert analysis unit 415 does not determine a lack of consistency between the received vehicle generated alert and the relevant static environmental data, the method moves to a seventh step 535 where the alert analysis unit 415 retrieves roadside sensor data from one or more of the sensors 190 for the defined area surrounding the vehicle generated alert location based on the location and time of the vehicle generated alert. The roadside sensor data may be retrieved from the time-space database 425. Such data can be processed off-line in the time-space database 425 and/or in the alert analysis unit 415. In an eighth step 540, the alert analysis unit 415 processes the retrieved roadside sensor data to select data relating to any combination of the location, speed, direction and type of objects in the defined area surrounding the vehicle generated alert location. The objects preferably include any other vehicles 140 located within the defined area surrounding the vehicle generated alert location. In any event, in a ninth step 545, the alert analysis unit 415 then determines if the received vehicle generated alert is consistent with the retrieved sensor data. The ninth step 545 of the method may be based on the type of the received vehicle generated alert. If, in the ninth step 545, the alert analysis unit 415 determines a lack of consistency between the received vehicle generated alert and the relevant sensor data, it records that the received vehicle generated alert is a false alert and generates a false alert map and/or updates the false alert map data in the map data unit 405. The RAMS 400 may also communicate the false alert and/or the false alert map data to the at least one RSU 130 and/or to the one or more ICGWs 150 of vehicles 140 and/or to the one or more user devices 180 in the defined geographical area 110 or in the coverage area of the RSU 130 or in the defined area surrounding the vehicle generated alert location.

If in the ninth step 545, the alert analysis unit 415 does not determine a lack of consistency between the received vehicle generated alert and the relevant sensor data, the method 500 outputs that the received vehicle generated alert is not a false alert.

Figure 14:
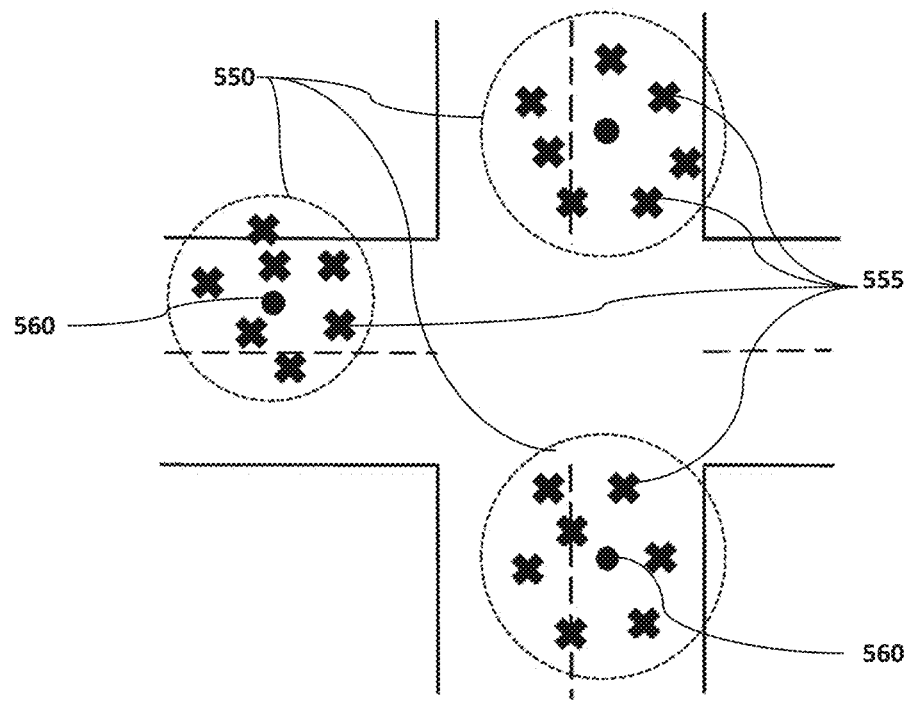
FIG. 14 illustrates a method of clustering false alerts.
Figure 15:
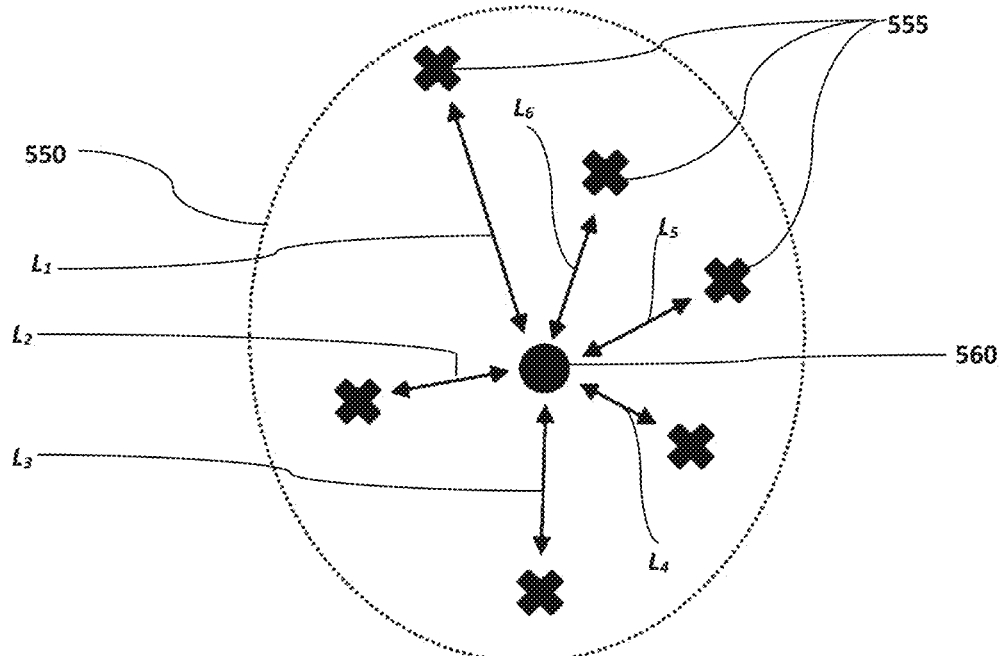
FIG. 15 illustrates a method of correlating influence factors for clustered false alerts.
Figure 16:
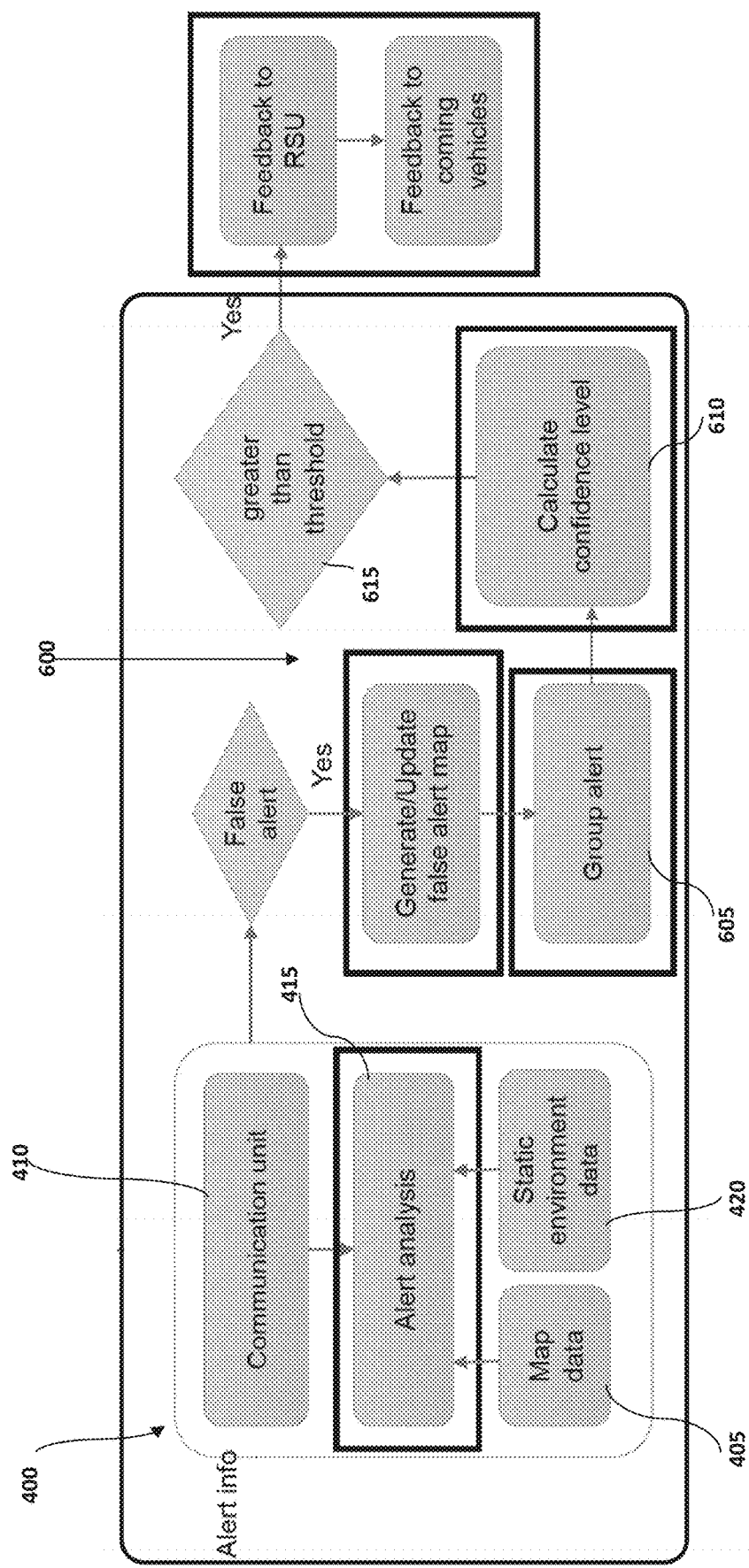
FIG. 16 is a schematic diagram illustrating a method of determining a confidence level in a false alert.

In an enhancement of the described methods as illustrated by FIGS. 14 to 16, it is preferred in a first step 605 of the enhanced method 600 (FIG. 16) to group false alerts by alert type in respective clusters 550 (FIG. 14) within the defined geographical area 110 or within another defined area within the defined geographical area 110. The another defined area is smaller than the defined geographical area 110 and may comprise an area the same as or similar to the defined area surrounding a vehicle generated alert location. The enhanced method 600 may include determining a parameter for each respective cluster 550 of false alerts.

FIG. 14 illustrates a method of clustering the false alerts in accordance with the enhanced method 600. In FIG. 14, the dashed-line circles delimit the sizes of the respective clusters 550 of false alerts, the "Xes" 555 represent the locations of the false alerts within each cluster 550 and the round black spots are indicative of a determined parameter for each the clusters 550 of false alerts. The parameter preferably comprises a location centroid 560 for a respective cluster 550.

The alert analysis unit 415 is preferably configured to group false alerts by alert type in the respective clusters 550 using a density-based spatial clustering of applications with noise (DBSCAN) algorithm using as input data one of more of: false alert location latitude data; false alert location longitude data; speed of vehicle associated with the false alert; direction of vehicle associated with the false alert; or road lane data of vehicle associated with the false alert. Other false alert data inputs may be included.

The alert analysis unit 415 is preferably configured to determine the centroid 560 for each respective cluster 550 using a K-means algorithm.

In a second step 610 of the enhanced method 600, the alert analysis unit 415 is configured to determine a confidence level C for each respective cluster 550 of false alerts based on a correlation of geographical information R for the false alerts in each respective cluster 550 and a correlation of influence factors I for the false alerts in each respective cluster 550.

The correlation of geographical information R for the false alerts in each respective cluster 550 is preferably obtained from:

$$R = 1 - \mathrm{Avg}(L_1, L_2, L_3, \ldots L_N)/\mathrm{Max}(L_1, L_2, L_3, \ldots L_N)$$

where N is the number of false alerts in the cluster 550; $L_N$ is the deviation or distance of each false alert from the centroid 560 of the cluster 550; and $$0 < R < 1.$$

The closer R is to 1, the higher the confidence level C. Multiple false alert locations which are close together will result in a higher value of R in the range from 0 to 1. Multiple false alert locations at a connected area with a same property such as a same carriageway lane will also result in a higher value of R in the range from 0 to 1.

In FIG. 15, N=6, i.e., $L_1$, $L_2$, $L_3$, $L_4$, $L_5$ and $L_6$ comprise the respective deviations or distances of the six false alert locations respectively denoted as "X" from the centroid 560 of the cluster 550.

The correlation of influence factors I for the false alerts in each respective cluster 550 is preferably obtained from:

$$I = \prod_{j=1}^{M} \left(1 - \frac{\sum_{i=1}^{N} |S_{j_i} - S_{j_{avg}}|}{\sum_{i=1}^{N} S_{j_i}}\right)$$

where M is the number of the influence factors;
where N is the number of false alerts in the cluster 550;
$S_j$ is an influence factor;
$S_{1_{avg}} = \mathrm{Avg}(S_{j_1}, S_{j_2}, S_{j_3}, \ldots, S_{j_N})$, where $S_{1_{avg}}$ is the average value of $S_j$; and $$0 < C < 1.$$

The closer I is to 1, the higher the confidence level C. The greater the similarity of the influence factors S for the false alerts in each respective cluster 550, the higher the value of I.

It will be understood, however, that there is no limit on the number of influence factors S which may be utilized as, the greater the number of influence factors S, the more accurate the result obtained.

For example, in FIG. 15, where N=6, considering speed $S_1$ and direction $S_2$ as the only two influence factors, where $S_{1_{avg}}$ is the average of the speeds $(S_{1_1}, S_{1_2}, S_{1_3}, \ldots, S_{1_N})$ of the vehicles for the fake alerts in the cluster and $S_{2_{avg}}$ is the average of the directions $(S_{2_1}, S_{2_2}, S_{2_3}, \ldots, S_{1_N})$ of the vehicles for the false alerts in the cluster, so the correlation of influence factors I formula:

$$I = \prod_{j=1}^{2} \left(1 - \frac{\sum_{i=1}^{6}|S_{ji} - S_{j_{avg}}|}{\sum_{i=1}^{6} S_{ji}}\right)$$

The confidence level C of each cluster 550 is preferably determined from $C=R\times I$ and the alert analysis unit 415 is configured in a third step 615 of the enhanced method 600 to compare the confidence level C of each cluster 550 to a predetermined, calculated or selected threshold H such that where C>H the AAMS 400 will then communicate false alert related data of the respective cluster 550 to the at least one RSU 130 and/or to one or more ICGWs 150 of vehicles 140 in the defined geographical area 110 or in the coverage area of the RSU 130 or in the defined area surrounding the vehicle generated alert location to the one or more vehicle on-board data processing units of the respective cluster. In one embodiment, where C>H for a cluster 550, the AAMS 400 will communicate false alert related data of the respective cluster 550 to the at least one RSU 130 which then broadcasts said data to the ICGWs 150 of vehicles 140 and/or to the user devices 180 in the defined geographical area 110. Equipped with the broadcast information, the ICGWs 150 of the vehicles 140 and/or the user devices 180 can locally make a decision in a manner which reduces or may even prevent the occurrences of false alerts. Consequently, each ICGW 150 and/or the user devices 180 can make a decision based not only on its local awareness of the environment but also taking into account data relating to false alerts previously generated by other ICGWs and/or user devices 180 thereby enabling the occurrences of such false alerts to be at least reduced.

The road management system 100 including the AAMS 400 may comprise a Vehicle-to-Everything (V2X) software system. The road management system 100 including the AAMS 400 may comprise a road safety management system.

One significant advantage of the system 100 of the AAMS 400 is that, by reducing or preventing the issuance of false alerts, it considerably reduces communication bandwidth between entities within the system 100 and reduces the computational load on entities such as RSUs 130 and EGWs 120.

In the following description, a system for controlling traffic data transmission in a 5G-V2X network will be described as being implemented in the embodiments of the system 100 of FIGS. 1 to 16 and like numerals will be used to denote like parts. However, it will be understood that the system of FIGS. 1 to 16 may be implemented in any suitable road management system.

Figure 17:
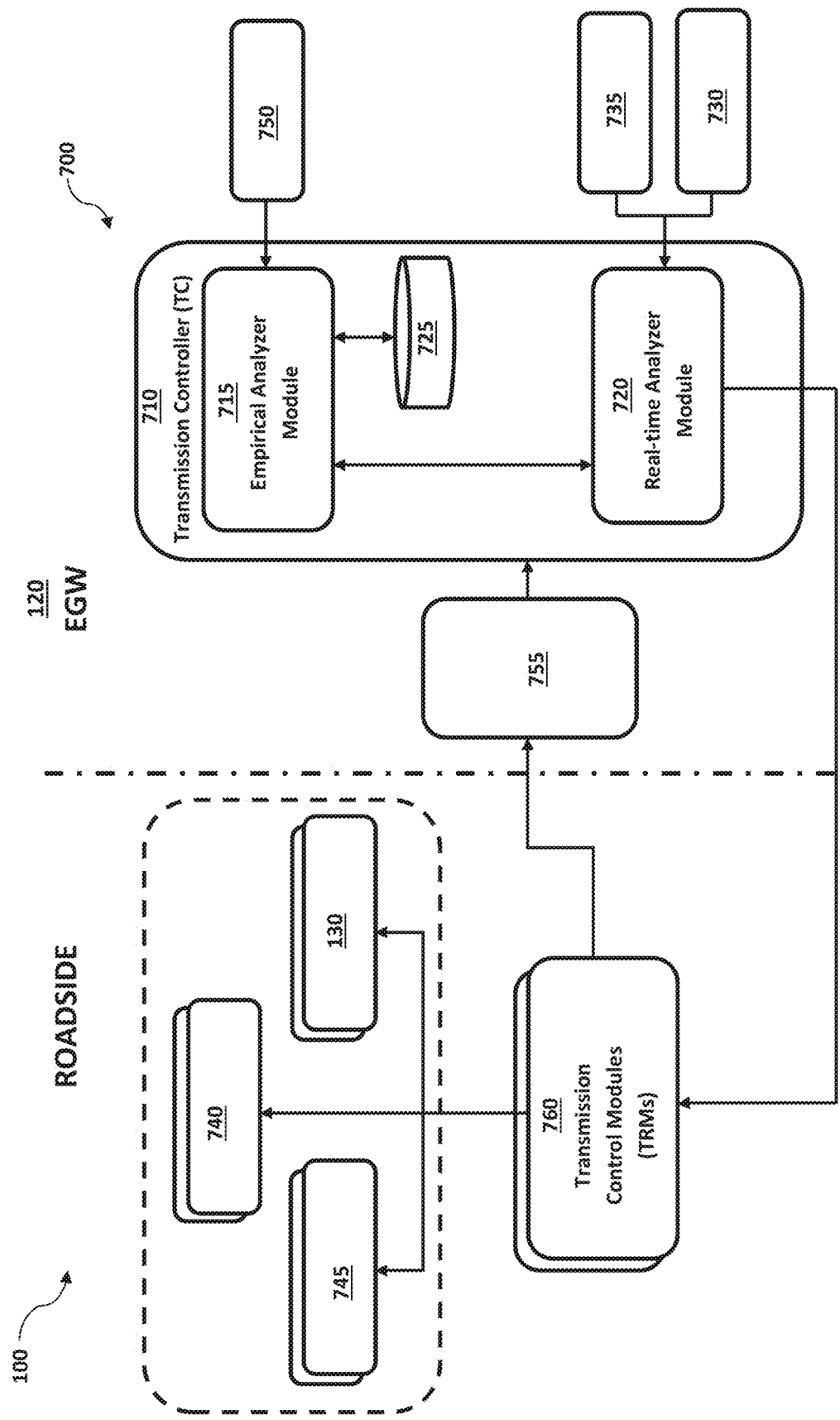
FIG. 17 is a schematic block diagram of a system for controlling traffic data transmission in a 5G-V2X network.

Referring to FIG. 17, the system 700 for controlling traffic data transmission in a 5G-V2X network comprises a transmission controller (TC) 710. The TC 710 is preferably located in an edge node such as an EGW 120 of a defined geographical area 104 of the network system 100, but, in some embodiments, may comprise a stand-alone device communicatively connected to the EGW 120 via one or more channels of the 5G-V2X network. The TC 710 comprises an empirical analyzer module 715 for processing historical traffic data to generate a transmission control policy and a real-time analyzer module 720 for processing real-time traffic data to adjust the transmission control policy. The TC 710 preferably also comprises a database 725 for storing traffic and associated data including historical data. Connected to the TC 710 are: a network monitor 730 which monitors, measures and/or determines operating parameters of the 5G-V2X network including measuring network delay d values; a map server 735 or database which provides map data to the TC 710 describing locations of any of RSUs 130, TSDs 740 (referred to as "other devices" or "devices" in FIG. 17), and any other roadside sensors 745; and a device information interface 750 which inputs traffic data received over one or more 5G channels from at least the TSDs 740 to at least the empirical analyzer module 715.

A data processor 755 is also preferably provided in communication with the TC 710. The data processor 755 may form part of the EGW 120 or may comprise a stand-alone device. The data processor 755 is configured to receive raw data from a plurality of roadside based transmission control modules (TRMs) 760 of the defined geographical area 104 and to process said raw data to provide structured traffic data to the TC 710. The raw data may be transmitted as point clouds and/or images which requires more bandwidth to transmit and more computational capacity to process compared to processed structured data. The structured traffic data may include any one or more of: speed of moving traffic objects detected by each of the plurality of TSDs; location of each detected moving traffic object; timestamp for each detected moving traffic object; number of detected traffic alerts; location of each detected traffic alert; timestamp for each detected traffic alert; number of detected traffic accidents; location of each detected traffic accident; and timestamp for each detected traffic accident. One advantage of this arrangement is that more efficient use is made of the system's computational capacity in that the raw data is processed by the data processor 755 rather than by processors provided at, for example, RSUs 130. Processing raw data such as point clouds and/or images requires considerable computational capacity. Distributing such computational capacity to RSUs 130 or the like would be wasteful of such resources particularly with respect to periods of low traffic data flows and may not be capable of processing the raw data in periods of high traffic data flows such as traffic rush hours.

The TRMs 760 collect traffic data from the TSDs 740 in accordance with the transmission control policy generated by the TC 710. The TRMs 760 communicate the received traffic data from the TSDs 740 as raw data via one or more 5G channels to the EGW 120 incorporating the TC 710 also in accordance with the transmission control policy. The TRMs 760 communicate the received traffic data to the data processor 755, if present, or directly to the TC 710 in the EGW 120 if no dedicated traffic data processor 755 is present.

The TC 710 functions to dynamically adjust a traffic data transmission frequency of one or more of said TSDs 740 in accordance with the transmission control policy by communication said transmission control policy to the TRMs 760. The transmission control policy generated by the TC 710 comprises a transmission policy for each respective TSD 760 by which means the TRMs 760 dynamically adjust the traffic data transmission frequency of each TSD 740 in accordance with each TSD's respective transmission policy. The TC 710 may communicate the transmission control policy to the TRMs 760 by way of policy commands.

Figure 18:
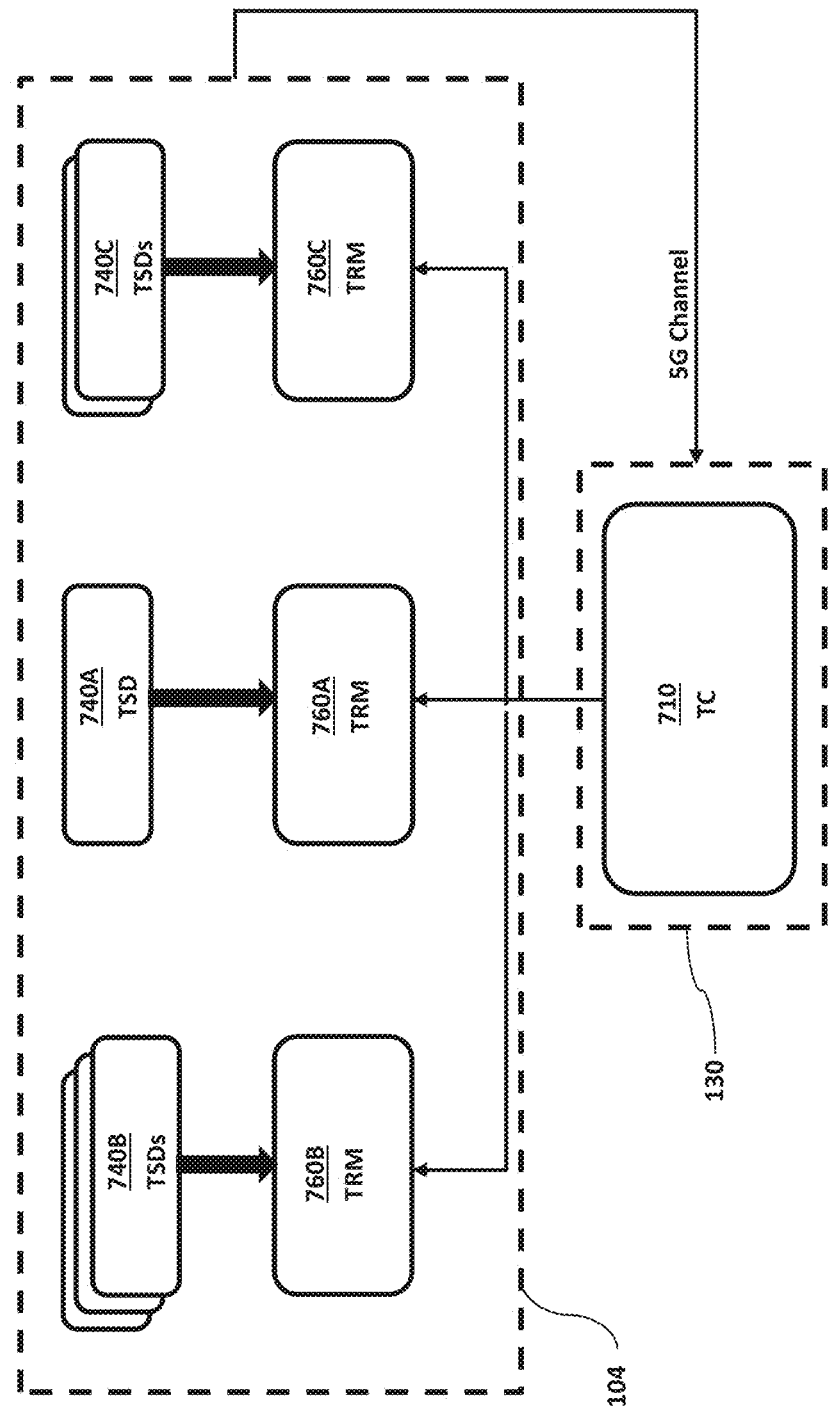
FIG. 18 is a schematic block diagram of an arrangement of transmission restriction modules (TRMs) and traffic sensing devices (TSDs) in the system of FIG. 17.

As illustrated in FIG. 18, a TRM 760A may be configured to apply the transmission control policy to a single associated TSD 740A. The TRM 760A may be located near to or in combination with the TSD 740A and apply to said TSD 740A the respective transmission policy for that TSD 740A provided by the transmission control policy generated by the TC 710. In some embodiments where a plurality of TSDs 740B (in FIG. 18) are arranged within the defined geographical area 104 in close proximity to one another such as all being at or near, for example, a traffic junction, the TSDs 740B may be formed as a group and serviced by a single TRM 760B. The single TRM 760B is configured to apply to each TSD 740B of the grouped TSDs 740B its respective transmission policy provided by the transmission control policy generated by the TC 710. In a similar manner, the grouped TSDs 740C of FIG. 18 are also served by a single TRM 760C, but the group of TSDs 740C in this example is fewer in number than the group of TSDs 740B. Grouping TSDs 740 in this manner reduces the number of TRMs 760 required for the defined geographical area 104.

Figure 19:
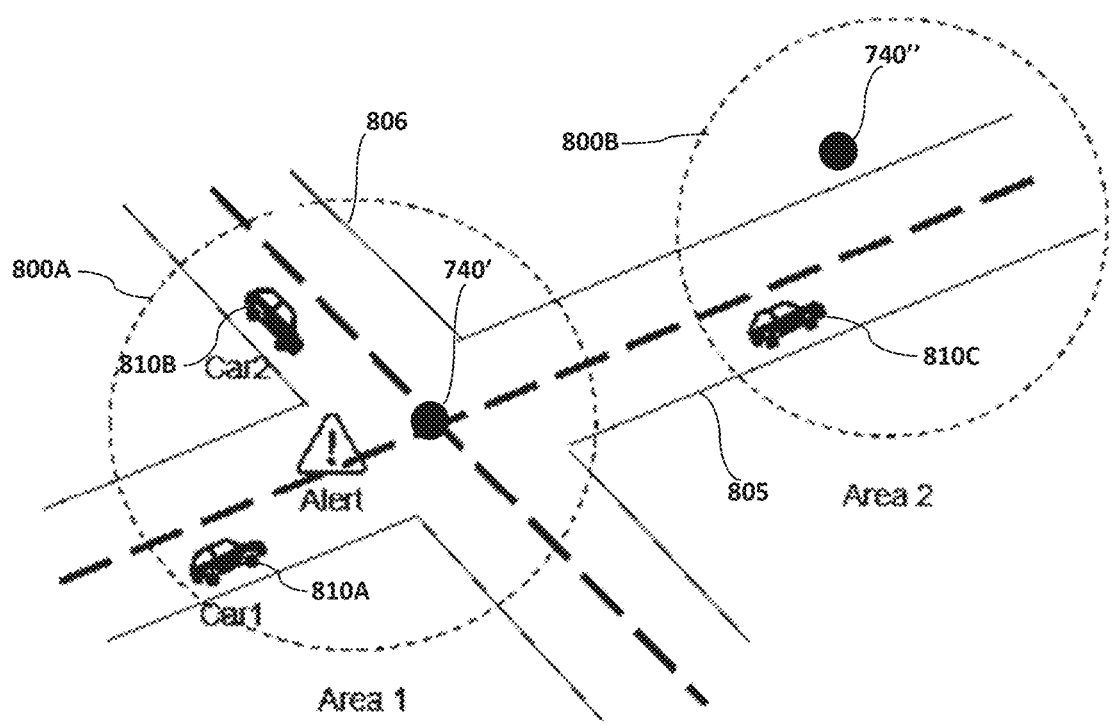
FIG. 19 illustrates comparative complexities of local areas surveilled by respective TSDs.

FIG. 19 illustrates comparative complexities of local areas, denoted respectively by dashed line circles 800A and 800B, within the defined geographical area 104 surveilled by respective TSDs 740', 740".

In the case of local area 800A, denoted as "Area 1", it can be seen that the TSD 740' is monitoring a junction between a first carriageway 805 and a second carriageway 806. In this example, a first vehicle 8104, denoted as "Car1", is approaching the junction along the first carriageway 805 and a second vehicle 810B, denoted as "Car2", is approaching the junction along the second carriageway 806. It will be understood that a junction between carriageways is a much more likely location for traffic problems including accidents than, for example, a straight section of carriageway. There is a greater likelihood for the first and second vehicles 810A, B to cause interference to each other at the junction thereby possibly giving rise to the issuance of one or more traffic alerts than would be the case if such vehicles 810A, B were travelling towards each other on, for example, opposing lanes of the straight section of carriageway. There is also the likelihood at the junction of the carriageways 805, 806 of the first and second vehicles 810A, B encountering pedestrians attempting to cross the carriageways 805, 806 which could give rise to other traffic alerts or the like.

By way of comparison, in the case of local area 800B, denoted as "Area 2", it can be seen that the TSD 740" is monitoring a straight section of the first carriageway 805. In this example, only a single vehicle 810C is travelling along one lane of the straight section of carriageway 805 away from the junction. There is a much lower likelihood in this scenario of events leading to a need to issue a traffic alert.

It will be appreciated from the comparison of scenarios in FIG. 19 that much more traffic data from TSD 740' for "Area 1" may be required or desired to enable useful information to be generated for the users of the first and second vehicles 810A, B and any other vehicles travelling within Area 1 than is required for generating useful information to the user of vehicle 810C in "Area 2".

The system and method of the invention provide novel methods for adjusting the respective frequency of traffic data transmission of TSDs such as TSDs 740', 740".

Figure 20:
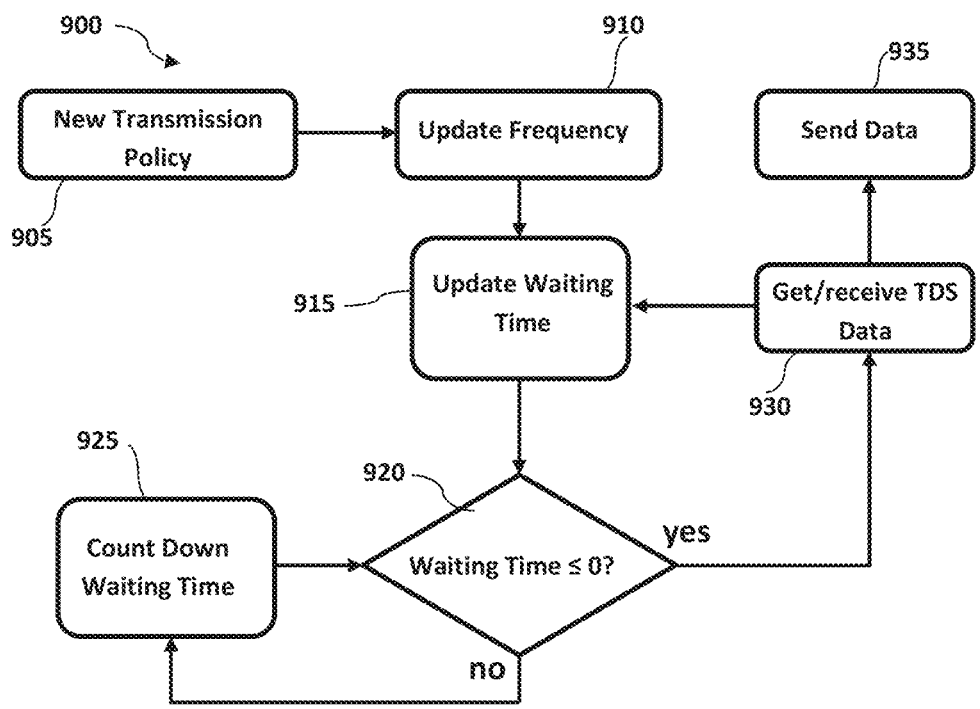
FIG. 20 is a flow diagram of a method of updating the transmission frequency of a TSD when receiving a new transmission policy for said TSD.

FIG. 20 is a flow diagram of a method 900 performed by the TRM 760 to update the transmission frequency of one or more of its associated TSDs 740 when the TRM 760 receives a new transmission policy for said TSD 740 from the TC 710.

In a first step 905 of the method 900, the TRM 760 receives an updated transmission control policy from the TC 710. The updated transmission control policy comprises or contains a new transmission policy for one or more TSDs 740 associated with the TRM 760. In this example of the method 900, it will be assumed, for ease of description, that the TRM 760 services a single TSD 740, but the method is equally applicable to a TRM 760 that services a group of TSDs 740.

In normal operation, the TRM 760 receives traffic data from the TDS 740 for transmission by the TRM 760 over a 5G channel to the data processor 755 or directly to the TC 710. The received traffic data is received by the TRM 760 for transmission according to the transmission frequency f defined by the transmission policy generated for the TSD 740, i.e., the traffic data received at the TRM 760 from the TSD 740 is received and transmitted after a time period defined by the transmission frequency f of the TSD's transmission policy has expired. This may be achieved by the TRM 760 sampling data from the TSD 740, or an RSU 130 associated with the TSD 740, on expiry of the time period defined by the transmission frequency f of the TSD's transmission policy and then immediately transmitting said data thereby ensuring said data is up to date data for real-time applications. Once a subsequent time period defined by the transmission frequency f expires, the process is repeated. In the case where there is no change to the TDS's transmission policy then the time periods being counted down have the same value, i.e., same transmission frequency.

In the updating method 900 where, in the first step 905, the TRM 760 receives an updated transmission policy for the TSD 740, then, in a second step 910, the TRM 760 updates the transmission frequency f for the TSD 740 in accordance with the updated transmission policy. In a third step 915 of the method 900, the TRM 760 immediately updates a waiting time for a next transmission of sampled traffic data received from the TSD 740. As a consequence of updating the waiting time in the third step 915, the TRM 760 applies the updated transmission policy to the TSD 740. In a fourth step of method 900, at decision box 920, the TRM 760 determines if the updated waiting time has expired. If it has not expired then, in a fifth step 925, the TRM 760 continues the countdown of the updated waiting time. Once it is determined at decision box 920 that the updated waiting time has expired, the TRM 760 transmits the sampled traffic data. This involves, in the sixth step 930, receiving the sampled traffic data on expiry of the counted-down time period from the TSD 740 and, in the seventh step 935, sending said traffic data to the data processor 755 or directly to the TC 710.

The transmission control policy generated by the TC 710 is preferably initially based on processing of historical traffic data by the Empirical Analyzer Module 715. In effect, the Empirical Analyzer Module 715 predicts or suggests a general, stable transmission control policy derived from the historical traffic data. In some embodiments, it is possible that only this transmission control policy is required for stable operation of the network system 100. The historical traffic data may comprise traffic data received at the TC 710 via the device information interface 750 from some or all of the TSDs 740 and possibly also data received from some of all of the RS-Us 130 and some or all of the other traffic sensors 745.

The Empirical Analyzer Module 715 preferably continues to process historical traffic data and any new traffic data received at the TC 710 and stored in the database 725 to update the general transmission control policy. The general transmission control policy includes a general frequency of transmission of traffic data value $f_g$ which is continuously or periodically updated. A respective general frequency of transmission of traffic data value $f_g$ is initially applied to all of the TSDs 740 to, in effect, apply a stable transmission of real-time traffic data from TSDs 740 in the network system 100. The general frequency of transmission of traffic data value $f_g$ may be the same for each of the TSDs 740, but is likely to vary amongst TSDs 740 due to the respective circumstances of the various TSDs 740. However, events may occur that require the transmission frequency of at least some TSDs 740 to be dynamically adjusted.

In one embodiment, one method of determining or calculating the general frequency of transmission of traffic data value $f_g$ is based on historical traffic data relating to vehicle speed with respect to a selected period of time and a number of traffic alerts and/or traffic accidents.

Assume that the speed of a moving traffic object, such as a vehicle, is v, and a safe distance between vehicles is set to $D_s$ (e.g. empirical maximum braking distance/2), then a safe traffic data transmission frequency for tracking the vehicle will be: $f_s = v/D_s$, where $f_s$ is the safe transmission frequency. Splitting 24 hours of a day into T periods, in each period t, the average speed of moving traffic objects detected by the TSDs 740 in a related local area of the defined geographical area 104 is $\bar{v}_t$, the number of accidents $a_t$ and the number of alerts $b_t$. Consequently, the risk level r is given by:

$$r_t = C1/(1+e^{-a_t}) + C2/(1+e^{-b_t})$$

where C1+C2==1, $r_t \in [0.5, 1]$; and
C are weighting factors.

The Empirical Analyzer Module 715 calculates the general frequency of transmission of traffic data value $f_g$ of each time period t from: $f_g^t = (\bar{v}_t/D_s) \times (0.5 + r_t)$. In a short time period such as half an hour, the speed of objects will not usually fluctuate very much, so $\bar{v}_t$ is used to calculate $f_g$ for most cases. If, however, the speed fluctuates considerably, then using a proportion of the maximum speed $v^t_{max}$ will be better for detecting moving traffic objects with high speed. If the speed fluctuates by a small amount, then using a proportion of minimum speed $v^t_{min}$ can help to save network resources. In general, if we consider the traffic condition of i days, then the general traffic data transmission frequency will be:

$$f_g^t = \Sigma_i f_g^t/i.$$

The generated transmission control policy may then be dynamically adjusted based on subsequent processing of real-time traffic data by the Real-time Analyzer Module 720, the real-time traffic data being preferably received at the TC 710 via the TRMs 760. The Real-time Analyzer Module 720 preferably continuously monitors the most recent (real-time) traffic data to adjust the transmission frequencies of selected TSDs 740 based on, for example, issued traffic alerts or the like and the proximity of any such TSDs 740 to the location of such traffic alerts. In this instance, traffic alerts may include traffic emergencies.

It is envisaged that dynamic adjustment of the transmission frequencies of TSDs 740 may be limited to only TSDs 740 in one or more small local areas 800 within the defined geographical area 104 dependent on traffic events such as alerts and emergencies, etc.

The TC 710 is preferably located in the EGW 120 as the EGW 120 typically has substantially more computational capabilities than the distributed devices such as the TRMs 760 and/or the RSUs 130, etc.

Figure 21:
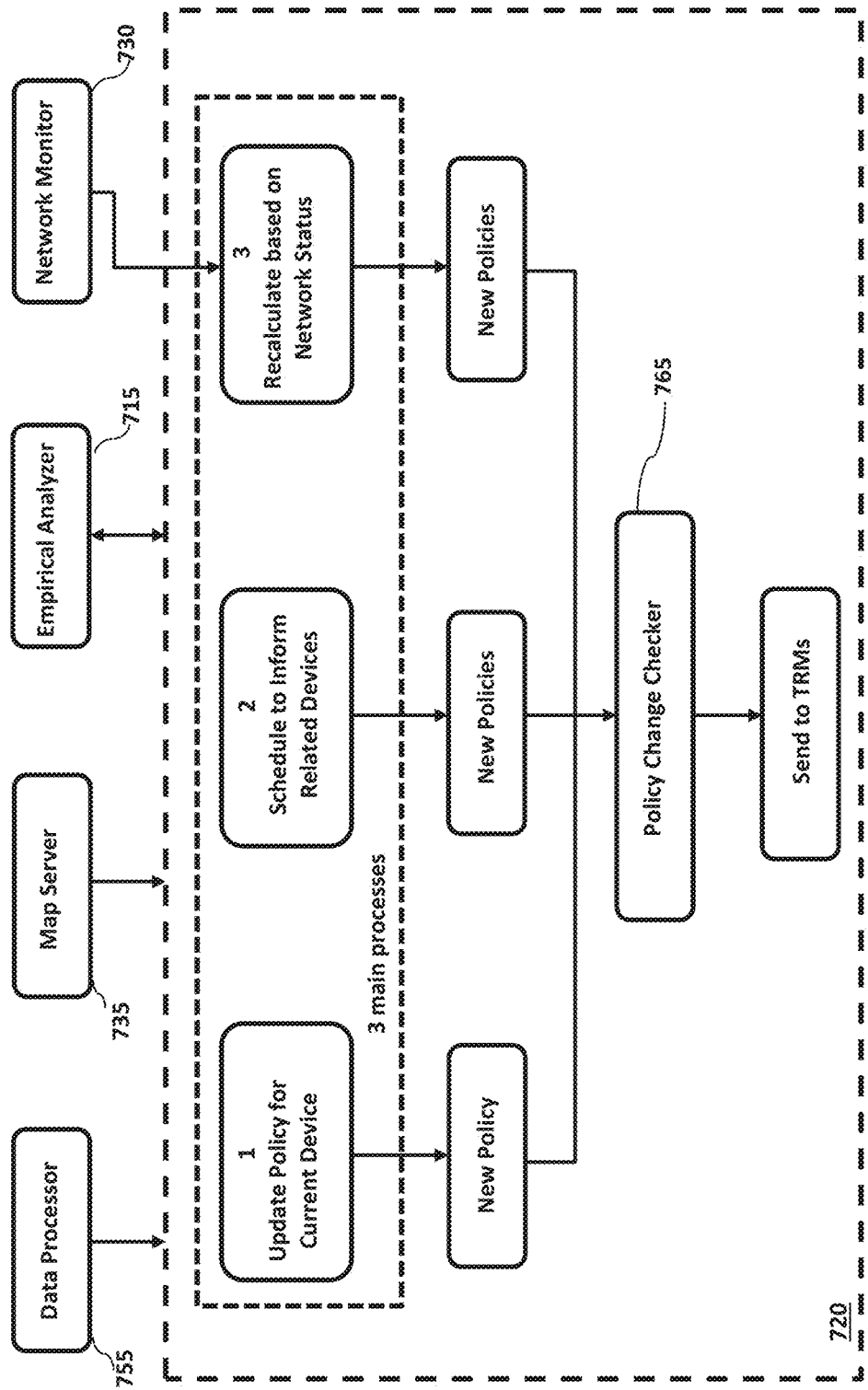
FIG. 21 is a schematic block diagram of a real-time analyzer module for a transmission controller (TC) in the system of FIG. 17.

Referring to FIG. 21, there is provided a schematic block diagram of the Real-time Analyzer Module 720 for the network system 100 which implements three main processes of: (1) updating the transmission frequency of a selected or source TSD 740 in response to real-time data describing parameters of detected moving traffic objects; (2) updating the transmission frequencies of target TSDs 740 in response to real-time data describing parameters of detected moving traffic objects; and (3) updating the transmission frequencies of selected or target TSDs 740 in response to one or measured network parameters. The Real-time Analyzer Module 720 includes a policy change checker module 765. The policy change checker module 765 checks whether the transmission policies of the TSDs 740 need to be changed. Preferably, updating the transmission frequencies of selected or target TSDs 740 occurs only after the policy change checker module 765 has implemented its check.

When receiving the real-time traffic data from TSDs 740 describing detected moving traffic objects, the Real-time Analyzer Module 720 analyzes current traffic status and calculates a respective new data traffic transmission frequency for each device as appropriate as will be described more fully with respect to FIG. 22. In the event that a dangerous moving traffic object such as a speeding vehicle is detected, it is desirable that the Real-time Analyzer Module 720 informs related or target TSDs 740 and/or determine new respective transmission policies for said related or target TSDs 740 as will be described more fully with respect to FIG. 23. The network monitor 750 measures parameters of the 5G-V2X network including the transmission delay d between the TRMs 760 and the EGW 120. In the event that the transmission delay d is longer than a predefined or predetermined value, the Real-time Analyzer Module 720 calculates new respective transmission policies for selected or target TSDs 740 as will be described more fully with respect to FIG. 24.

Figure 22:
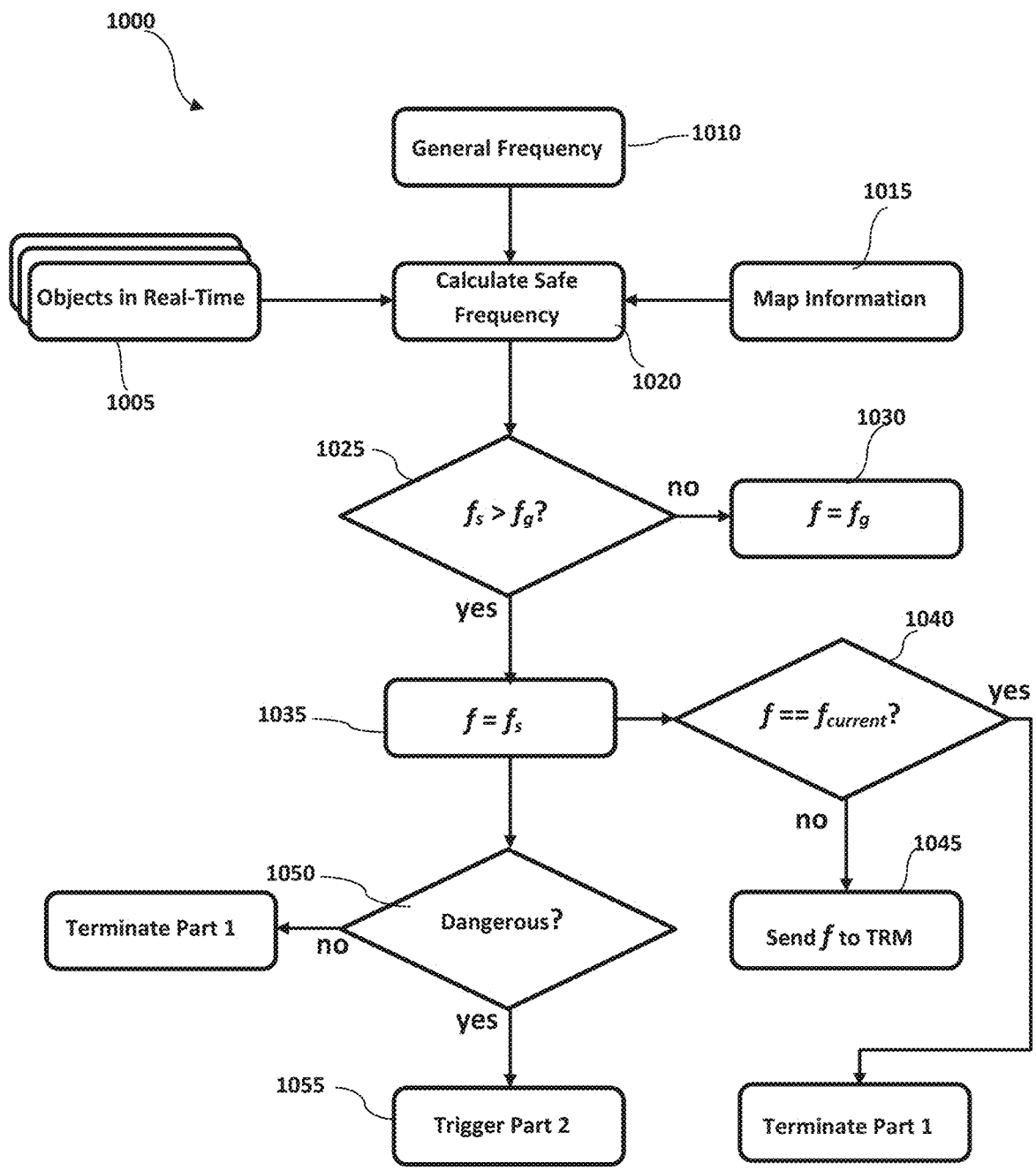
FIG. 22 is a flow diagram of a method of updating the transmission frequency of a TSD in response to real-time data describing parameters of detected moving traffic objects.

Referring to FIG. 22, a first method (method 1 in FIG. 21) 1000 performed by the Real-time Analyzer Module 720 starts with step 1005 where the data processor 755 sends structured traffic data describing moving traffic objects to the Real-time Analyzer Module 720. The structured traffic data provided by the data processor 755 is generated from raw traffic data received by the TRMs 760 from their associated TSDs 740. The structured traffic data describes at least the speed of the moving traffic objects and the locations of said objects. Other data inputs to the Real-time Analyzer Module 720 include the general data traffic transmission frequency $f_g$ calculated in step 1010 by the Empirical Analyzer Module 720 and map data provided in step 1015 by the map server 735. In step 1020, the Real-time Analyzer Module 720 calculates a safe traffic data transmission frequency $f_s$ for a selected or source TSD 740. The safe traffic data transmission frequency $f_s$ for the selected or source TSD 740 may be based on the previously described safe traffic data transmission frequency $f_s = v/D_s$, where the selected or source TSD 740 is tracking only one vehicle. In some embodiments where the selected or source TSD 740 is tracking multiple vehicles, it is preferred to use the maximum speed of the tracked vehicles such that the safe traffic data transmission frequency for the selected or source TSD 740 is given by $f_s=v_{max}/D_s$ where $v_{max}$ is a maximum speed of the detected moving traffic objects (e.g., vehicles) within one timestamp period of the selected or source TSD 740. If in decision box 1025, it is determined for said selected or source TSD 740 that $f_s$ is not greater than the value of $f_g$, for said selected or source TSD 740, then a new traffic data transmission frequency f for the selected or source TSD 740 is set in step 1030 as $f=f_g$. If, however, at decision box 1025, it is determined that $f_s$ is greater than $f_g$, then the new traffic data transmission frequency f for the selected or source TSD 740 is changed in step 1035 to $f=f_s$. Consequently, the new traffic data transmission frequency f for the selected or source TSD 740 is assigned a value of either $f_s$ or $f_g$. The value of the general traffic data transmission frequency $f_g$ is calculated by the Empirical Analyzer Module 715 as a balance between system performance and power saving. This allows the TSDs 740 to operate at a relatively low traffic data transmission frequency for most periods of time, but the method provides the ability to make sure each TSD 740 can track and detect new moving traffic objects and to dynamically adjust the traffic data transmission frequency ($f_s$ or $f_g$) according to the speed of the detected moving traffic objects.

In decision box 1040, $f_{current}$ is the current traffic data transmission frequency f for the TSDs 740 maintained by the policy change checker Module 765 of the Real-time Analyzer module 720. If, in decision box 1040, it is determined that the new value of f from either of steps 1030 or 1035 is not equal to the selected or source TSD's current value of $f_{current}$ then the Real-time Analyzer Module 720 generates a new transmission policy for the selected or source TSD 740, otherwise the value of f for the selected or source TSD 740 is maintained at $f=f_{current}$. At step 1045, Real-time Analyzer Module 720 sends the new transmission policy for the selected or source TSD 740 to that TSD's associated TRM 760. Where, in the first method 1000, it is determined that $f_s$ is greater than $f_g$ for the selected or source TSD 740, then, at decision box 1050, a determination is made of whether or not the detected moving traffic object is a dangerous object, i.e., that it presents a threat to other vehicle users. If at decision box 1050 it is determined that the detected moving traffic object presents a threat to other vehicle users then, at step 1055, the Real-time Analyzer Module 720 is triggered to implement a second method 1100 (method 2 in FIG. 21). The determination that a detected moving traffic object presents a threat to other vehicle users may be based on a predetermined, selected or calculated speed limit $v_{limit}$ for a local area 800 of the defined geographical area 104. The local area 800 may encompass several TSDs 740. The speed limit $v_{limit}$ for said local area 800 may be obtained from the map server 735. If the speed v of the detected moving traffic object in the local area 800 is greater than speed limit $v_{limit}$ and/or greater than a multiple of the average speed $\bar{v}$ of moving traffic objects in said local area 800 then the detected moving object is determined to be a dangerous object. It is preferred than the multiple level of the average speed $\bar{v}$ of moving traffic objects is twice said average speed $\bar{v}$.

Figure 23:
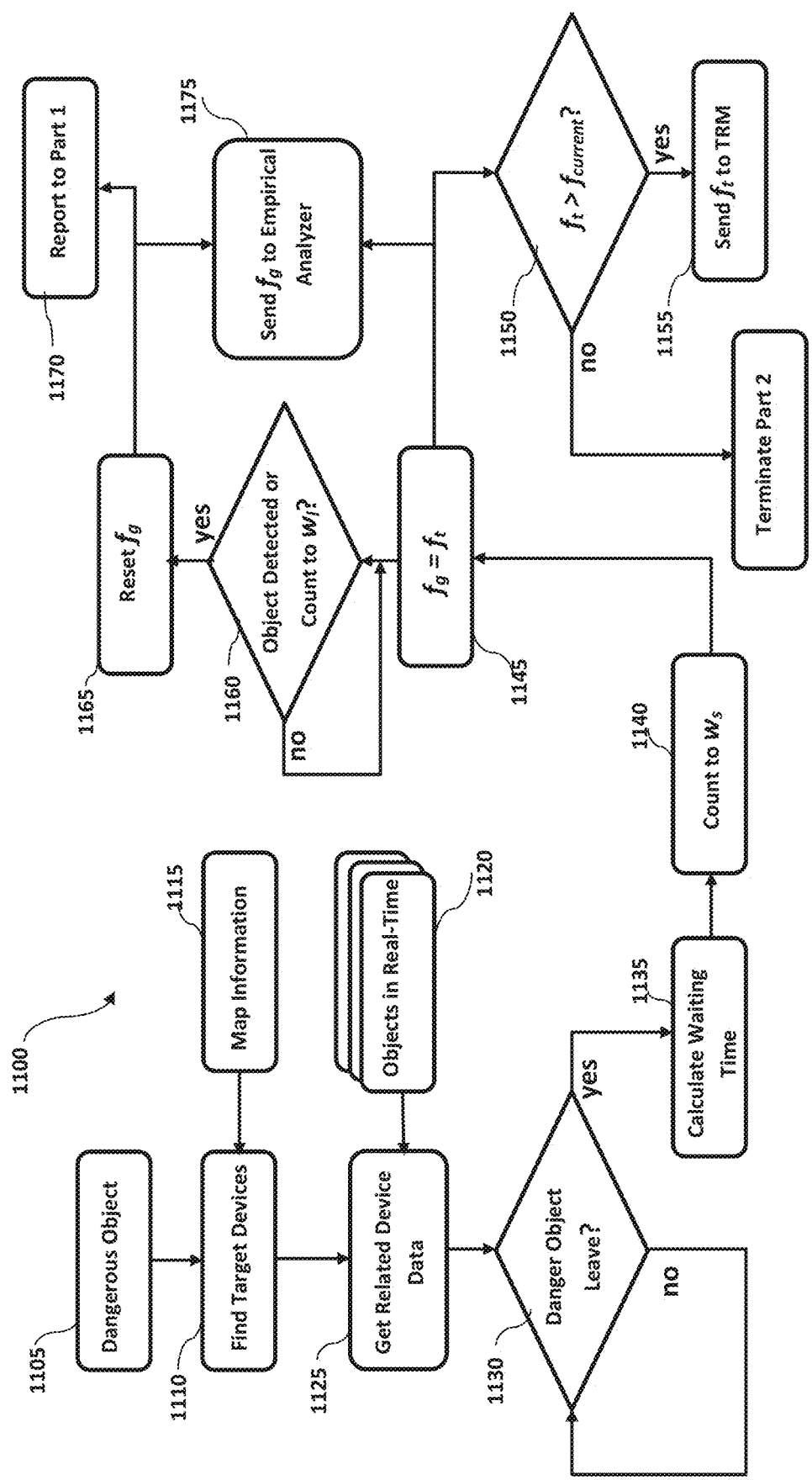
FIG. 23 is a flow diagram of a method of updating the transmission frequencies of target TSDs in response to real-time data describing parameters of detected moving traffic objects.

Referring to FIG. 23, a second method (method 2 in FIG. 21) 1100 performed by the Real-time Analyzer Module 720 starts with step 1105 of receiving (from method 1) an indication that the detected moving traffic object is a dangerous moving traffic object. The second method 1100 is focused on selected or target TSDs 740. The selected or target TSDs 740 are determined from the map data provided by the map server 735 to be TSDs 740 which are in the vicinity of the detected dangerous moving traffic object, i.e., TSDs 740 which are in the vicinity of the source TSD 740 which first detected the dangerous moving traffic object and which will likely soon detect the dangerous moving traffic object.

Figure 25:
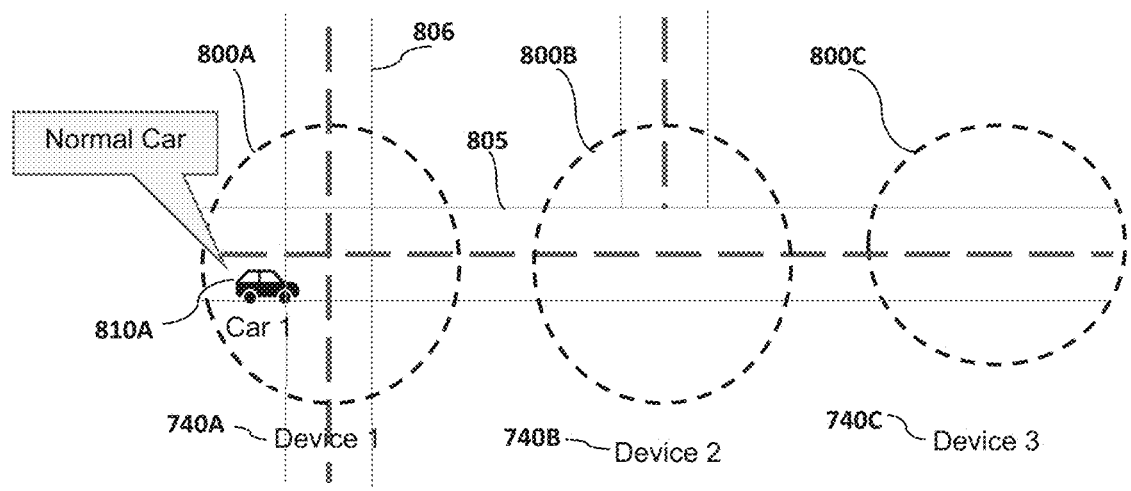
FIG. 25 is an example of monitoring of a normal traffic situation by TSDs.

Reference is made here to FIG. 25 which shows a vehicle 810A denoted as "car1" travelling through a junction of first and second carriageways 805, 806 in a first local area 800A serviced by a TSD 740A. The vehicle 810A is denoted as a "normal car" meaning that it is travelling within a speed limit. The vehicle 810A is travelling along the first carriageway 805 towards a junction with a second carriageway 806 and onwards towards a second local area 800B serviced by a second TSD 740B and a third local area 800C serviced by a third TSD 740C. In this scenario, the vehicle 810A does not pose a danger to other vehicle users. In this scenario, it is not necessary to implement the second method in the Real-time Analyzer Module 720.

Figure 26:
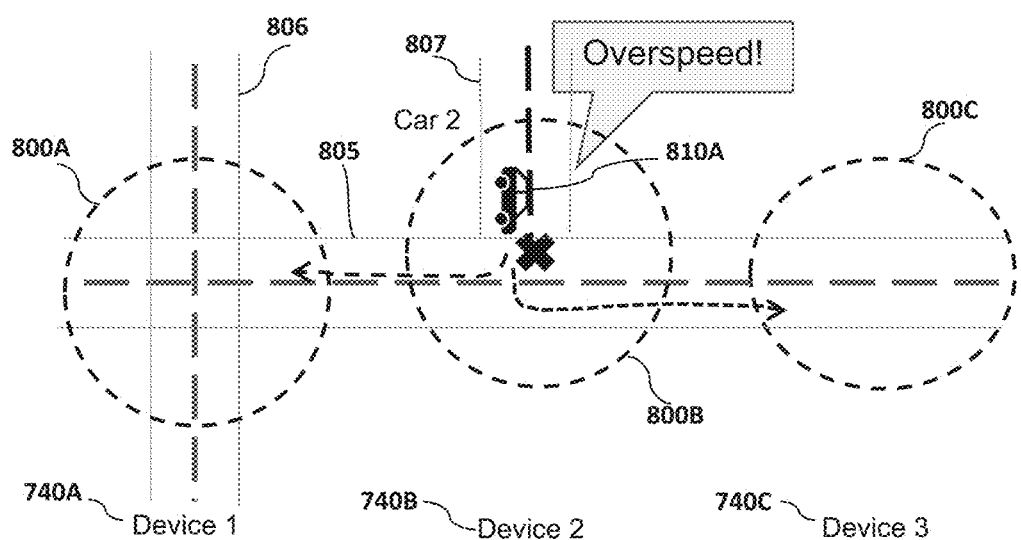
FIG. 26 is an example of monitoring of an abnormal traffic situation by TSDs.

By way of contrast, reference is made to FIG. 26 in which the vehicle 810A is travelling towards a junction of a third carriageway 807 with the first carriageway 805 in the second local area 800B. The second TSD 740B has detected that the vehicle 810A is speeding and thus it is determined that vehicle 810A comprises a dangerous moving traffic object. Consequently, it is necessary to implement the second method in the Real-time Analyzer Module 720. However, the second TSD 740B cannot yet determine which route vehicle 810A will take. As shown in FIG. 26, the vehicle 810A may choose to take one of two possible routes once it reaches the junction. Consequently, while the second TSD 740B can be treated as comprising the source TSD, the second method treats the first and third TSDs 740A, C as selected or target TSDs despite that fact that only one of the first and third TSDs 740A, C will subsequently detect the vehicle 810A dependent on the route chosen at the junction. Each of the first and third TSDs 740A, C will be notified in advance of the detection of the speeding vehicle 810A by the source TSD 740B. It will be appreciated that there might be more than two possible routes a detected vehicle may take, but the foregoing is sufficient to illustrate the concept of source TSDs and target TSDs.

It will be understood that, whilst each of the first, second and third local areas 800A, B, C are shown as comprising only one TSD 740 A, B, C, the local areas 810A, B, C may be larger than suggested and may comprise a plurality of TSDs 740.

Referring again to FIG. 23, in a next step 1110 of the second method 1100, the Real-time Analyzer Module 720 determines from map data provided at step 1115 which TSD 740 comprises the source TSD and which TSDs 740 are to be treated as selected or target TSDs 740, i.e., the TSDs 740 which may likely detect the dangerous moving traffic object detected by the source TSD 740. Following steps 1110 and 1115, the data processor 755 transmits, in step 1120, structured traffic data describing the dangerous moving traffic object and any other moving traffic objects detected by the source and selected or target TSDs 740 which is received, in step 1125, at the Real-time Analyzer Module 720. In a similar manner as in the first method 1000, the structured traffic data provided by the data processor 755 is generated from raw traffic data received by the respective TRMs 760 of the source and target TSDs 740.

At decision box 1130 of the second method 1100, a determination is made of whether or not the detected dangerous moving traffic object has left the local area or coverage area of the source TSD 740. Once it is determined that the detected dangerous moving traffic object has left the local area or coverage area of the source TSD 740, a next step 1135 of the second method 1100 calculates a waiting time $w_s$ for each selected or target TSD 740. The waiting $w_s$ time for each selected or target TSD 740 is dependent on a respective length of a path $L_{Device}$ from the current detected location of the dangerous moving traffic object to each of said selected or target TSDs 740. The respective lengths of the paths $L_{Device}$ from the current detected location of the dangerous moving traffic object to each of said selected or target TSDs 740 can be determined from the map data received at step 1115 and the real-time traffic data provided at step 1120. Assuming the maximum speed of the dangerous moving traffic object is $V_{max}$, where $V_{max}$ may be dependent on a type of the dangerous moving traffic object, the shortest respective waiting time for each of the selected or target TSDs 740 is $w_s^{device} = L_{Device}/V_{max}$. Preferably, step 1135 also determines a respective longest waiting time $w_l$ for each selected or target TSDs 740. The longest waiting time $w_l$ for each of the selected or target TSDs 740 is $w_l^{device} = L_{Device}/(v_{limit}/2 \text{ or } \bar{v})*(0.5+r)$.

In a next step 1140 of the second method 1100, the Real-time Analyzer Module 720 counts down the shortest waiting time $w_s$ for each of the selected or target TSDs 740. When the shortest waiting time $w_s$ for one of said selected or target TSDs 740 expires, it indicates that the dangerous moving traffic object may have reached the coverage area of said one of said selected or target TSDs 740. In step 1145, the Real-time Analyzer Module 720 calculates a temporary traffic data transmission frequency $f_t$ based on the general traffic data transmission frequency $f_g$ provided by the Empirical Analyzer Module 720 where $f_t = f_g * v_{danger}/v_{limit}$ or, $f_t = f_g * v_{danger}/(2*\bar{v})$ if $v_{limit}$ is not obtained from the map data. Then, $f_g$ is set equal to $f_t$. The former value of $f_g$ can be considered as $f_{g\_old}$ and the new value of $f_g$ can be considered as $f_{g\_new}$. The value of $v_{danger}$ may be determined based on the speed of the speeding vehicle.

If, at decision box 1150, it is determined that $f_t$ is greater than $f_{current}$ for the one of the selected or target TSDs 740 then, at step 1155, the Real-time Analyzer Module 720 generates a new transmission policy for said one of the selected or target TSDs 740 and transmits said new transmission policy to the TRM 760 associated with said one of the selected or target TSDs 740. However, if, at decision box 1150, it is determined that $f_t$ is not greater than $f_{current}$ for the one of the selected or target TSDs 740 then the Real-time Analyzer Module 720 maintains the current transmission policy for said one of the selected or target TSDs 740.

Steps 1140 through to 1155 are performed respectively for each of the selected or target TSDs 740.

Once, at decision box/step 1160, one of said selected or target TSDs 740 detects the dangerous moving traffic object the Real-time Analyzer Module 720 has counted down the longest waiting time $w_l$ for said one of the selected or target TSDs 740 indicating that the speed of the dangerous moving traffic object is now deemed safe, the Real-time Analyzer Module 720 at step 1165 resets the current respective general traffic data transmission frequency $f_g$ for each of the selected or target TSDs 740 based on current traffic data and, at step 1170 returns to the first method 1000. After either of steps 1145 or 1165, the Real-time Analyzer Module 720 sends, at step 1175, the recalculated or reset general traffic data transmission frequency $f_g$ to the Empirical Analyzer Module 720 for use in calculating an updated general traffic data transmission frequency $f_g$.

Figure 24:
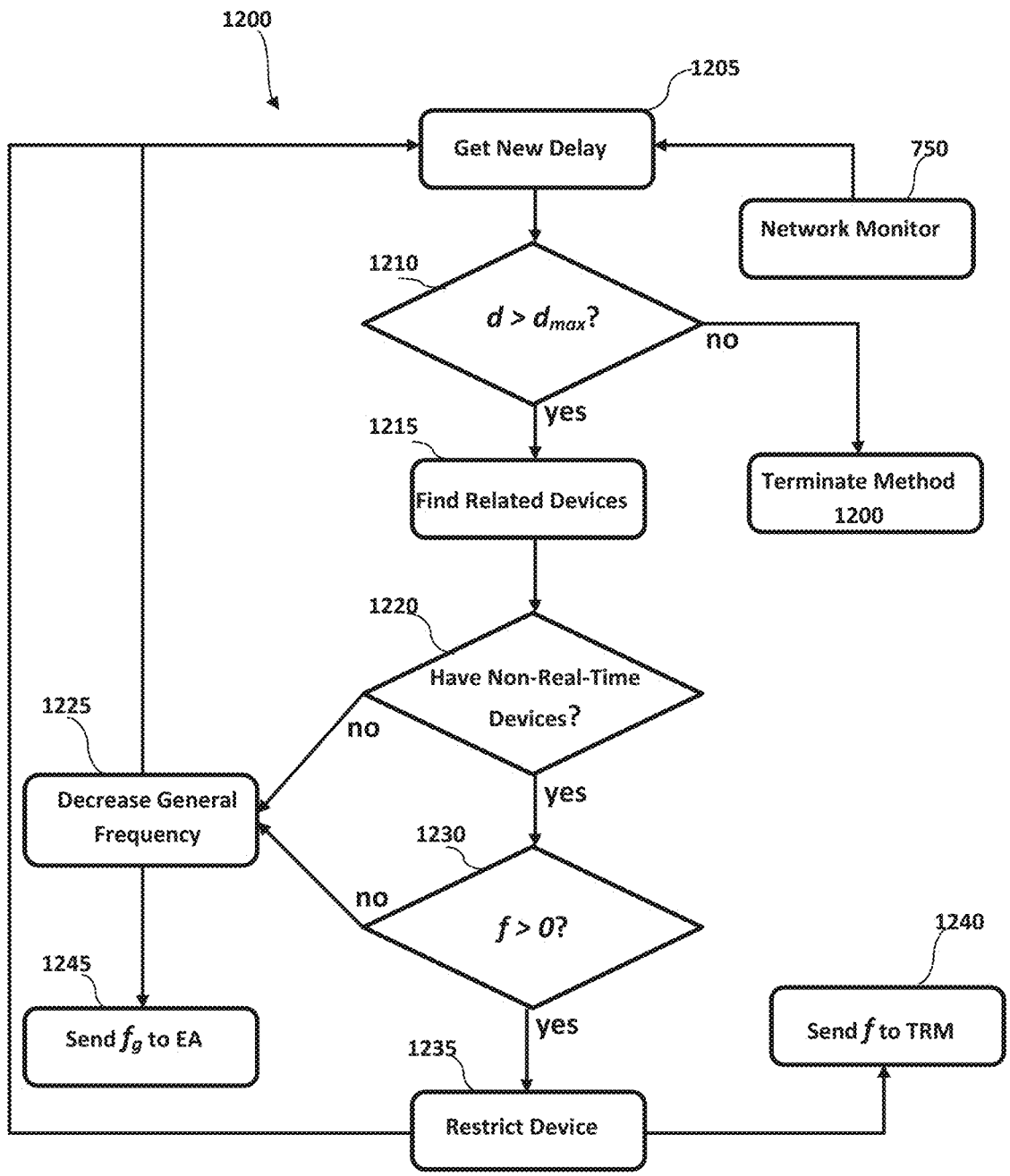
FIG. 24 is a flow diagram of a method of updating the transmission frequencies of target TSDs in response to measured network delays.

Referring to FIG. 24, a third method (method 3 in FIG. 21) 1200 performed by the Real-time Analyzer Module 720 starts with step 1205 of receiving a new value of the network delay d between the TRMs 760 and the EGW 120 from the network monitor 750. In some embodiments where the 5G-V2X network is integrated with a Time Sensitive Network (TSN), the network delay value d can be obtained directly from the TSN, otherwise the network delay value d must be determined by the network monitor 750. The maximum delay value can be derived from $d_{max} = 1/f_{current}$, where $f_{current}$ is the current traffic data transmission frequency f for the TSDs 740 maintained by the policy change checker module 765 of the Real-time Analyzer Module 720. If, in decision box 1210, the Real-time Analyzer Module 720 determines that one or more TSDs 740 have a network delay value $d > d_{max}$ then the Real-time Analyzer Module 720 uses, in step 1215, map data from the map data server to identify nearby related TSDs 740.

At decision box 1220, it is determined that none of the identified related devices 740 comprises a non-real-time data sending device, then, at step 1225, the general traffic data transmission frequency $f_g$ for the related devices 740 is decreased.

If it is determined at decision box 1220 that some of such devices 740 do send non-real-time data then, at decision box 1230, it is determined if the transmission frequency of the non-real-time data sending devices 740 is greater than zero. If so, a percentage of the transmission frequency of the non-real-time data sending devices will be decreased by: $(d/d_{max})-1$ at step 1235 and the new value off for the non-real-time data sending devices 740 will be sent to the respective TRMs 760 at step 1240.

Once the general traffic data transmission frequency $f_g$ for the related devices 740 has been decreased at step 1225 and/or the data transmission frequency f for the non-real-time related devices 740 has been decreased at step 1235, the method 1200 obtains a new network delay value d and repeats the steps of the third method 1200 and repeats the decreases in one or both of the general traffic data transmission frequency $f_g$ for the related devices 740 and the data transmission frequency f for the non-real-time related devices 740 until d is less than $d_{max}$. The method 1200 may include decreasing the transmission frequency of the non-real-time data sending devices 740 to zero. However, the general traffic data transmission frequency $f_g$ for the related real-time data sending devices 740 cannot be decreased to zero in order to protect the safety of the network system 100. Consequently, the methods performed by the Real-time Analyzer Module 720 include a limit to the amount by which the general traffic data transmission frequency $f_g$ for the related real-time data sending devices 740 can be decreased.

In the third method 1200, after the general traffic data transmission frequency $f_g$ for the related devices 740 has been decreased at step 1225, then, at step 1245, the new value of $f_g$ for the related devices 740 is sent to the Empirical Analyzer Module 720. In one embodiment, $f_g$ cannot be decreased below $f_g/2$.

Figure 27:
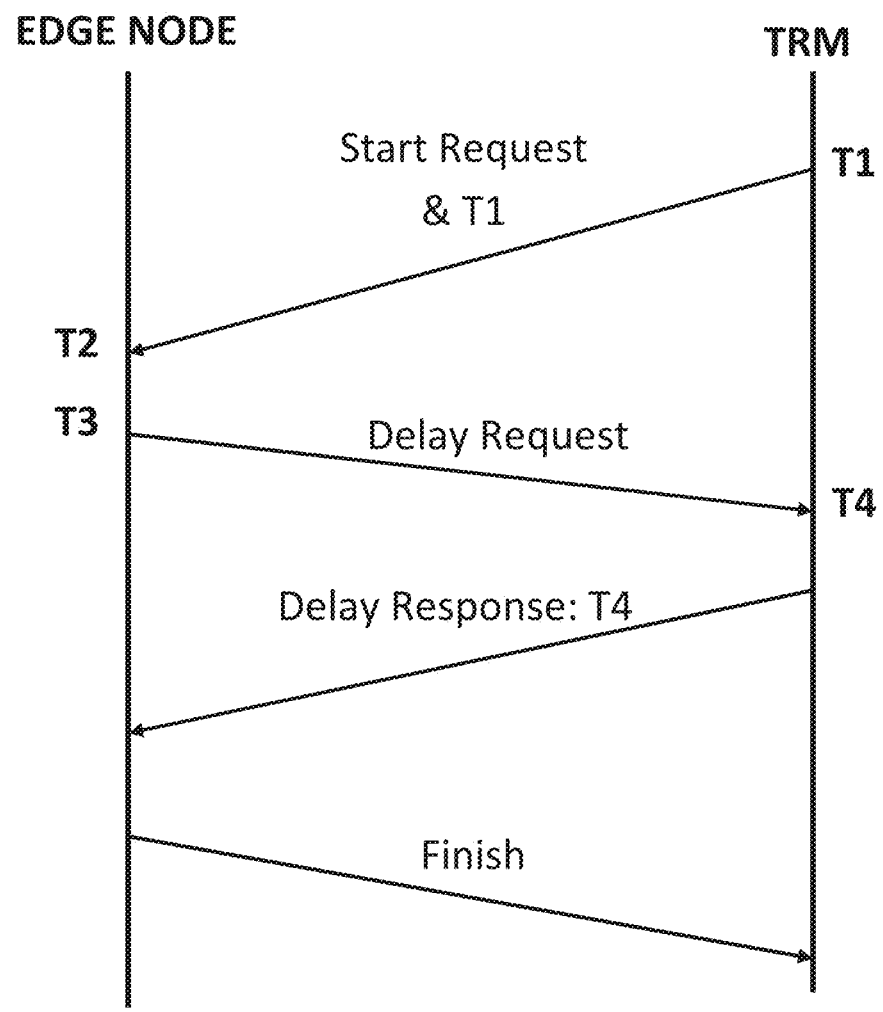
FIG. 27 is a timing diagram illustrating calculation of a network delay.

The policy change checker module 765 preferably checks whether the transmission policies of the TSDs 740 need to be changed in any of decision box 1040 of FIG. 22, decision box 1150 of FIG. 23, and decision box 1230 of FIG. 24.

Where the 5G-V2X network is not integrated with a TSN, the network monitor 750 may calculate the network delay value d by any suitable method. One method is illustrated by the timing diagram of FIG. 27.

The method comprises:
1. The TRM 760 sends a "start request" message to the EGW 120 together with a timestamp T1;
2. After the EGW 120 receives the "start request" with timestamp "T1" at timestamp T2, it sends a delay request to TRM at T3;

3. After the TRM 760 receives the "delay request" at T4, it sends "T4" as a "delay response" to the EGW 120;
4. After the EGW 120 receives T4 from the TRM 760, it will send a signal to the TRM 760 to finish the delay estimation; and
5. The network delay d can be calculated by the network monitor 750 from d=(T4−T1−T3+T2)/2.

The methods hereinbefore described with respect to FIGS. 17 to 27 may be implemented at each EGW 120 of the network system 100.

The apparatuses described above may be implemented at least in part in software. Those skilled in the art will appreciate that the apparatuses described above may be implemented at least in part using general purpose computer equipment or using bespoke equipment.

Here, aspects of the methods and apparatuses described herein can be executed on any apparatus comprising the communication system. Program aspects of the technology can be thought of as "products" or "articles of manufacture" typically in the form of executable code and/or associated data that is carried on or embodied in a type of machine readable medium. "Storage" type media include any or all of the memory of the mobile stations, computers, processors or the like, or associated modules thereof, such as various semiconductor memories, tape drives, disk drives, and the like, which may provide storage at any time for the software programming. All or portions of the software may at times be communicated through the Internet or various other telecommunications networks. Such communications, for example, may enable loading of the software from one computer or processor into another computer or processor. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible non-transitory "storage" media, terms such as computer or machine "readable medium" refer to any medium that participates in providing instructions to a processor for execution.

While the invention has been illustrated and described in detail in the drawings and foregoing description, the same is to be considered as illustrative and not restrictive in character, it being understood that only exemplary embodiments have been shown and described and do not limit the scope of the invention in any manner. It can be appreciated that any of the features described herein may be used with any embodiment. The illustrative embodiments are not exclusive of each other or of other embodiments not recited herein. Accordingly, the invention also provides embodiments that comprise combinations of one or more of the illustrative embodiments described above. Modifications and variations of the invention as herein set forth can be made without departing from the spirit and scope thereof, and, therefore, only such limitations should be imposed as are indicated by the appended claims.

In the claims which follow and in the preceding description of the invention, except where the context requires otherwise due to express language or necessary implication, the word "comprise" or variations such as "comprises" or "comprising" is used in an inclusive sense, i.e., to specify the presence of the stated features but not to preclude the presence or addition of further features in various embodiments of the invention.

It is to be understood that, if any prior art publication is referred to herein, such reference does not constitute an admission that the publication forms a part of the common general knowledge in the art.

The invention claimed is:

1. A method of controlling traffic data transmission in a fifth generation vehicle-to-everything (5G-V2X) wireless communication network, the method comprising:
   provisioning a plurality of traffic sensing devices (TSDs) within at least one defined geographical area of the 5G-V2X network;
   provisioning an edge gateway module (EGW) for the at least one defined geographical area to be in communication with the plurality of TSDs over one or more 5G channels of said 5G-V2X network; and
   provisioning each of the TSDs to provide traffic data over the one or more 5G channels to a transmission controller (TC) via the EGW;
   wherein the TC dynamically adjusts a traffic data transmission frequency of at least one TSD of the plurality of TSDs in accordance with a transmission control policy.

2. The method of claim 1, wherein the transmission control policy is adjustable in response to one or both of: historical traffic data; and real-time traffic data.

3. The method of claim 2, wherein the historical traffic data is processed to determine a general traffic data transmission frequency $f_g$ for the plurality of TSDs and the real-time traffic data is processed to determine a safe traffic data transmission frequency $f_s$ for the at least one TSD of the plurality of TSDs such that, where $f_s > f_g$, the traffic data transmission frequency f of the at least one TSD is adjusted to $f = f_s$ otherwise it remains as $f = f_g$.

4. The method of claim 3, wherein, in the event of a dangerous moving traffic object being detected within the defined geographical area, the real-time traffic data is processed to determine one or more temporary traffic data transmission frequencies $f_t$ for the plurality of TSDs or a subset of the plurality of TSDs comprising some or all of a set of source and target TSDs and, if $f_t > f_g$ for the plurality of TSDs or the set of source and target TSDs, then the general traffic data transmission frequency for the plurality of TSDs or the set of source and target TSDs is updated to $f_t$.

5. The method of claim 4, wherein the method of updating the traffic data transmission frequency to the temporary traffic data transmission frequency $f_t$ is applied to only the target TSDs of the set of source and target TSDs using real-time traffic data from the target TSDs such that, once a predetermined parameter for the detected dangerous moving traffic object is met, the general traffic data transmission frequency $f_g$ for the target TSDs is reset to the normal general traffic data transmission frequency $f_g$ calculated by an empirical analyzer module.

6. The method of claim 3, wherein, if a 5G-V2X network transmission delay d exceeds a predetermined, selected or calculated maximum delay value $d_{max}$, then the method decreases the general traffic data transmission frequency $f_g$ for some or all of the plurality of TSDs to a new reduced value of traffic data transmission frequency $f_{g\_new}$ until $d < d_{max}$.

7. The method of claim 6, wherein the method applies a limit in the decrease in the general traffic data transmission frequency $f_g$ such that $f_{g\_new} \geq f_{g\_old}/2$.

8. The method of claim 2, wherein the transmission control policy is initially based on processing of historical traffic data and the resultant transmission control policy is dynamically adjusted based on subsequent processing of real-time traffic data.

9. The method of claim 1, wherein each TSD of the plurality of TSDs and/or each group of TSDs of the plurality of TSDs has associated with it a respective transmission restriction module (TRM), each TRM being controlled to apply a determined or calculated transmission policy for its associated TSD or each TSD of its associated group of TSDs, the determined or calculated transmission policies comprising the transmission control policy.

10. The method of claim 9, wherein the TRM collects data from its associated TSD and/or the TSDs of its associated group of TSDs and then transmits the received data over the one or more 5G channels to the TC in accordance with the determined or calculated transmission policy for its associated TSD or each TSD of its associated group of TSDs.

11. The method of claim 10, wherein, for its associated TSD or the TSDs of its associated group of TSDs, the TRM counts down a waiting time for sending traffic data received at the TRM from a selected TSD in accordance with the selected TSD's determined or calculated transmission policy, then when receiving an updated transmission policy for the selected TSD, the TRM immediately updates the waiting time for sending traffic data in accordance with the updated transmission policy and sends the received traffic data on expiry of the updated waiting time, and then resets the waiting time for sending traffic data in accordance with the updated transmission policy for subsequently received data from the selected TSD.

12. A system for controlling traffic data transmission in a fifth generation vehicle-to-everything (5G-V2X) wireless communication network, the system comprising:
a plurality of traffic sensing devices (TSDs) located within at least one defined geographical area; and
an edge gateway module (EGW) of the at least one defined geographical area in communication with the plurality of TSDs over one or more 5G channels of the 5G-V2X network, each of the TSDs being configured to provide traffic data over the one or more 5G channels to a to a transmission controller (TC) via the EGW;
wherein the TC is configured to dynamically adjust a traffic data transmission frequency of at least one TSD of the plurality of TSDs in accordance with a transmission control policy.

13. The system of claim 12, wherein the system includes a traffic data processor configured to process raw traffic data from the plurality of TSDs and to send structured traffic data to the TC, the structured traffic data including any one or more of: speed of moving traffic objects detected by each of the plurality of TSDs; location of each detected moving traffic object; timestamp for each detected moving traffic object; number of detected traffic alerts; location of each detected traffic alert; timestamp for each detected traffic alert; number of detected traffic accidents; location of each detected traffic accident; and timestamp for each detected traffic accident.

14. The system of claim 12, wherein the TC comprises an empirical analyzer module for processing historical traffic data and/or a real-time analyzer module for processing real-time traffic data to adjust the transmission control policy and wherein the empirical analyzer module is configured to process the historical traffic data to determine a general traffic data transmission frequency $f_g$ for the plurality of TSDs, the real-time analyzer module is configured to process the real-time traffic data to determine a safe traffic data transmission frequency $f_s$ for the at least one TSD of the plurality of TSDs, and the TC is configured such that, where $f_s > f_g$, the TC adjusts the traffic data transmission frequency f of the at least one TSD to $f = f_s$ otherwise the TC maintains the traffic data transmission frequency f of the at least one TSD as $f = f_g$.

15. The system of claim 14, wherein the real-time analyzer module is configured to, in the event that the real-time analyzer module detects dangerous moving traffic object within the defined geographical area, to determine a temporary traffic data transmission frequency $f_t$ for the plurality of TSDs or a subset of the plurality of TSDs comprising some or all of a set of source and target TSDs and, if $f_t > f_g$ for the plurality of TSDs or the set of source and target TSDs, then to update the normal general traffic data transmission frequency $f_g$ for the plurality of TSDs or the set of source and target TSDs to $f_t$.

16. The system of claim 15, wherein the real-time analyzer module is configured to apply the updated traffic data transmission frequency as the temporary traffic data transmission frequency $f_t$ to only the target TSDs of the set of source and target TSDs based on real-time traffic data from the target TSDs such that, once a predetermined parameter for the detected dangerous moving traffic object is met, real-time analyzer module resets the general traffic data transmission frequency $f_g$ for the target TSDs to the normal general traffic data transmission frequency $f_g$ calculated by the empirical analyzer module.

17. The system of claim 14, wherein the system includes a network monitor module which is configured to measure a 5G-V2X network delay d and to provide the measured value of network delay d to the real-time analyzer module, the real-time analyzer module being configured such that, if the measured value of the 5G-V2X network transmission delay d exceeds a predetermined, selected or calculated maximum delay value $d_{max}$, the real-time analyzer module decreases the general traffic data transmission frequency $f_g$ for some or all of the plurality of TSDs to a new reduced value of traffic data transmission frequency $f_{g\_new}$ until $d < d_{max}$.

18. The system of claim 12, wherein the system includes a transmission restriction module (TRM) for each TSD of the plurality of TSDs and/or each group of TSDs of the plurality of TSDs, each TRM being configured to apply a determined or calculated transmission policy for its associated TSD or each TSD of its associated group of TSDs.

19. The system of claim 18, wherein:
each TRM is configured to collect data from its associated TSD and/or the TSDs of its associated group of TSDs and to then transmits the received data over the one or more 5G channels to the TC in accordance with the determined or calculated transmission policy for its associated TSD or each TSD of its associated group of TSDs; and
each TRM is configured to count down a waiting time for sending traffic data received at the TRM from a selected TSD in accordance with the selected TSD's determined or calculated transmission policy, then when receiving an updated transmission policy for the selected TSD, the TRM is configured to immediately update the waiting time for sending traffic data in accordance with the updated transmission policy and to send the received traffic data on expiry of the updated waiting time, and then reset the waiting time for sending traffic data in accordance with the updated transmission policy for subsequently received data from the selected TSD.

20. A transmission controller (TC) for controlling traffic data transmission in a fifth generation vehicle-to-everything 5G-V2X wireless communication network, the TC comprising:
- an empirical analyzer module for processing historical traffic data received from some or all of a plurality of roadside devices (TSDs) located within a defined geographical area of the 5G-V2X network, the empirical analyzer module configured to process the historical traffic data to determine a transmission control policy for the plurality of TSDs; and
- a real-time analyzer module configured to process real-time traffic data received from some or all of the plurality of TSDs to adjust the transmission control policy to provide a dynamic transmission control policy;
- wherein the real-time analyzer module is configured to control transmission restriction modules (TRMs) associated with the plurality of TSDs to apply a respective transmission policy for each of the plurality of TSDs.

* * * * *